US007956106B2

(12) United States Patent
Yang et al.

(10) Patent No.: US 7,956,106 B2
(45) Date of Patent: *Jun. 7, 2011

(54) ORGANIC SILOXANE COMPOSITE MATERIAL CONTAINING POLYANILINE/CARBON BLACK AND PREPARATION METHOD THEREOF

(75) Inventors: Cheng-Chien Yang, Longtan Township, Taoyuan County (TW); Kuo-Hui Wu, Taoyuan (TW); Wang Tsae Gu, Longtan Township, Taoyuan County (TW); Yuen-Hsin Peng, Longtan Township, Taoyuan County (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 133 days.

This patent is subject to a terminal disclaimer.

(21) Appl. No.: 11/976,933

(22) Filed: Oct. 30, 2007

(65) Prior Publication Data

US 2009/0110931 A1 Apr. 30, 2009

(51) Int. Cl.
*C08K 3/04* (2006.01)
*H01B 1/04* (2006.01)
*H01B 1/24* (2006.01)

(52) U.S. Cl. ........ 523/215; 523/209; 524/495; 252/502; 252/510

(58) Field of Classification Search .................. 523/209, 523/212, 200, 215, 334; 524/596, 595, 495; 428/447, 405, 407; 252/502, 510
See application file for complete search history.

(56) References Cited

U.S. PATENT DOCUMENTS 5,093,407 A * 3/1992 Komai et al. ................ 524/495
5,498,372 A * 3/1996 Hedges ......................... 252/511
2006/0003244 A1 * 1/2006 Grande et al. ............ 430/106.2

* cited by examiner

*Primary Examiner* — Vasu Jagannathan
*Assistant Examiner* — Hannah Pak
(74) *Attorney, Agent, or Firm* — Rosenberg, Klein & Lee

(57) ABSTRACT

An organic siloxane composite material containing polyaniline/carbon black and a preparation method thereof are disclosed. The organic siloxane composite material containing polyaniline/carbon black consists of a plurality of polyaniline/carbon black composites distributed in organic siloxane precursor while the organic siloxane composite material containing polyaniline/carbon black includes from 10 to 30 weight percent of polyaniline/carbon black composites. The preparation method of organic siloxane composite material containing polyaniline/carbon black includes the steps of: distributing a plurality of polyaniline/carbon black composites in organic siloxane precursor to produce a first solution; and adding a cross-linking agent into the first solution, after reaction with each other, an organic siloxane composite material containing polyaniline/carbon black is produced.

6 Claims, 25 Drawing Sheets

ORGANIC SILOXANE COMPOSITE MATERIAL CONTAINING POLYANILINE/CARBON BLACK AND PREPARATION METHOD THEREOF

BACKGROUND OF THE INVENTION

The present invention relates to an organic siloxane composite material containing polyaniline/carbon black and a preparation method thereof, especially to an organic siloxane composite material containing polyaniline/carbon black and a preparation method thereof being applied to fields of conductivity and corrosion protection.

The research and development of conductive coatings have been over a half-century. Working as conductive layer, electromagnetic wave shielding layer and antistatic coating, the conductive coatings have broad perspective and increasing market demands. The membrane surface of the conductive coating has higher resistance, charge generated thereon is not dissipated effectively so that static charges tend to accumulate thereon. This leads to certain limitations on applications of some respects such as dust proofing and bacteria resistance in medicine, protection from electric shock in medical operations, static protection for preventing static ignition and explosion in mine environment and petrochemistry, dust-proofing for protection of integrated circuit, and fiber accumulation in spinning industry. The conductive coating is special coating or meeting various requirements. The conductive coating is coating with conductor and semiconductor properties and the conductivity is above $10^{-10}$ S/cm, being applied to various fields such as electronic and electric appliance industry, printed circuit board, switches, Marine Antifouling Coatings, electrothermal material, and electromagnetic wave shielding, and surface protection.

Some researchers use polyester resin, epoxy resin, and Polyurethane resin as resin coating while graphite and zinc oxide are as conductive and anti-corrosion coatings. In literatures, graphite as conductive filler is added with epoxy resin and it is found that the conductivity is dramatically improved when amount of the graphite is over 50 wt. %. However, addition of graphite results in poor physical and mechanical properties and poor processability. This leads to limits on usefulness of the conductive coating.

Thus an organic siloxane composite material containing conductive and corrosion resistant polyaniline, and high conductive and corrosion resistant nano-scale carbon black is produced while the conductive and corrosion resistant polyaniline has features of light weight, good plasticity, easy raw materials acquisition, easy synthesis and high stability so as to overcome defects of poor physical property, poor mechanical property and poor processability due to large amount of graphite being added. Moreover, the present invention has features of high conductivity and high corrosion resistance without adding large amount of carbon black. Thus weight of conductive graphite coating is dramatically reduced while high conductivity and corrosion resistance are also achieved.

SUMMARY OF THE INVENTION

Therefore it is a primary object of the present invention to provide an organic siloxane composite material containing polyaniline/carbon black with high conductivity and high corrosion resistance.

It is another object of the present invention to provide an organic siloxane composite material containing polyaniline/carbon black that overcomes shortcomings of conductive coatings caused by large amount of graphite being added such as reduced physical property, poor mechanical property and poor processability.

It is a further object of the present invention to provide an organic siloxane composite material containing polyaniline/carbon black that reduces weight of conductive graphite coating and achieves conductivity as well as corrosion resistance.

In order to achieve above objects, the present invention provides an organic siloxane composite material containing polyaniline/carbon black and a preparation method thereof. The organic siloxane composite material containing polyaniline/carbon black consists of a plurality of polyaniline/carbon black composites distributed in organic siloxane precursor while the organic siloxane composite material containing polyaniline/carbon black includes from 10 to 30 weight percent of polyaniline/carbon black composites. The preparation method of organic siloxane composite material containing polyaniline/carbon black includes the steps of: distributing a plurality of polyaniline/carbon black composites in organic siloxane precursor to produce a first solution; and adding a cross-linking agent into the first solution, after reaction with each other, an organic siloxane composite material containing polyaniline/carbon black is produced.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

An organic siloxane composite material containing polyaniline/carbon black according to the present invention includes a plurality of polyaniline/carbon black composites distributed in organic siloxane while the organic siloxane composite material containing polyaniline/carbon black contains from 10 to 30 weight percent polyaniline/carbon black composites.

The polyaniline/carbon black is a polyaniline/carbon black composite material with core-shell structure. The diameter of the polyaniline/carbon black core-shell particle ranges from 50 to 250 nm. The polyaniline covers on surface of the carbon black to form core-shell structure of polyaniline/carbon black composite. The carbon back is 10-30 percent of weight of the polyaniline/carbon black core-shell composite material. The diameter of the carbon back particle is 10~80 nm. The organic siloxane is sol-like organic siloxane or organic siloxane composite with network structure.

Figure 1:
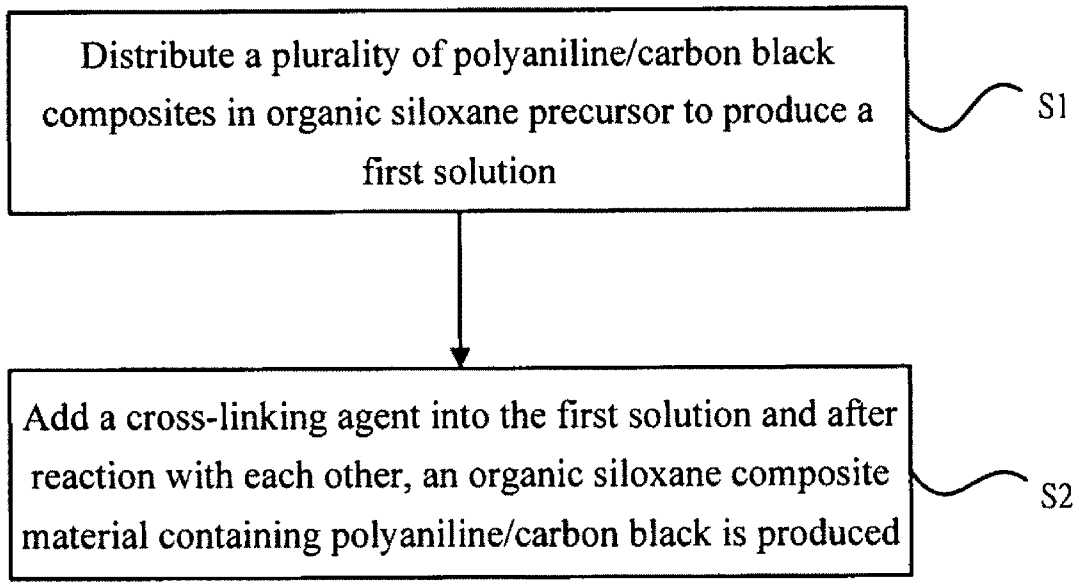
FIG. 1 is a flow char showing steps of preparing an organic siloxane composite material containing polyaniline/carbon black according to the present invention.

Refer to FIG. 1, a method for preparing an organic siloxane composite material containing polyaniline/carbon black according to the present invention includes following steps:

S1 Distribute a plurality of polyaniline/carbon black composites in organic siloxane precursor to produce a first solution.

S2 Add a cross-linking agent into the first solution and after reaction with each other, an organic siloxane composite material containing polyaniline/carbon black is produced.

In the step S1, precursors of the organic siloxane include tetraethoxysilane, tetrapropoxide zirconateand and glycidoxypropyltrimethoxysilane while tetraethoxysilane, tetrapropoxide zirconateand and glycidoxypropyltrimethoxysilane are in a molecular ratio of 1:1:4. The step S1 further includes a step of adding an acid aqueous solution into the first solution. The acid aqueous solution is nitric acid aqueous solution. The cross-linking agent used in the step S2 is tetraethylenepentamine.

Preparation Method of Polyaniline/Carbon Black (PANI/CB)

(1) Add carbon black (CB; Degussa PHG-1P) into a dispersing agent (US, GE QF-DT-7100S) and 50 ml ethanol solution, then add 100 ml HCl (hydrogen chloride) (2M) into the mixture solution; after ultrasound vibration for an hour, carbon black solution is produced.

(2) Before being used, aniline is purified by second distillation and then the purified aniline is added into above mixture solution. Keep solution temperature at 0 to 5 Celsius degrees and stir the solution for an hour.

(3) Dissolve ammonium persulfate into 25 ml HCl (2M) and slowly drop the mixture into the mixture solution in step (2) and stir the solution well for 2 hours.

(4) After vacuum filtration, use HCl (2M) acid rinsing at room temperature. Then a sample is produced after vacuum filtration. After being heated for drying and grinded, powder of PANI/CB composite with core-shell structure is obtained.

Preparation Method of Ormosil-PANI/CB Composite Material (1) Add precursors having tetraethoxysilane (TEOS), tetrapropoxide zirconateand (TPOZ) and glycidoxypropyltrimethoxysilane (GPTMS) in a molecular ratio of 1:1:4 into nitric acid aqueous solution (1.45 ml nitric acid in 36 ml deionized water). Then various amount (respectively 10%, 20% and 30% of weight of the TEOS+TPOZ+GPTMS mixture solution) of PANI/CB is add into above mixture solution and stir the solution for 5 days to produce a first solution.

(2) Then add tetraethylenepentamine (TEPA) into the first solution and stir well for 4 hours to get sol-like organic siloxane composite material containing polyaniline/carbon black.

Samples of organic siloxane composite material containing polyaniline/carbon black, respectively are labeled in Ormosil-PANI/CB(10)-10, Ormosil-PANI/CB(10)-20, Ormosil-PANI/CB(10)-30, Ormosil-PANI/CB(20)-10, Ormosil-PANI/CB (20)-20, Ormosil-PANI/CB(20)-30, Ormosil-PANI/CB(30)-10, Ormosil-PANI/CB(30)-20 and Ormosil-PANI/CB(30)-30, wherein PANI/CB represents polyaniline/carbon black, (10) represents amount of carbon black is 10 wt % of the polyaniline/carbon black, -10 represents amount of PANI/CB is 10 wt % of organic siloxane composite material containing polyaniline/carbon black. The rest is referred as similar way above mentioned.

Preparation of Aluminum Alloy with Organic Siloxane Composite Material Containing Polyaniline/Carbon Black and Powder of Organic Siloxane Composite Material Containing Polyaniline/Carbon Black (1) Use water sander and #200 sandpaper to polish surface of aluminum alloy piece ((AA-2024-T3(Al—Cu—Mg) and (AA-6061-T6 (Al—Mn—Si))).

(2) Alkaline cleaning (5% sodium hydroxide solution) and acid rinsing (50% nitric acid aqueous solution) the aluminum alloy piece for 1 minute respectively (for removing grease).

(3) Water rinsing the aluminum alloy piece for 30 seconds.

(4) Dry the aluminum alloy piece at room temperature for 4 hours.

(5) By spin-coating, the sol-like organic siloxane composite material containing polyaniline/carbon black is coated on a 2.5×5×0.1 cm aluminum alloy piece and totally for 3 layers.

(6) Keep the coated aluminum alloy piece and rest solution static at room temperature for 2 days, then dried at 60° C. for 24 hours. After being dried, the test piece is tested by a salt spray test.

(7) Or the sol-like organic siloxane composite material containing polyaniline/carbon black is dried at 60° C. for 24 hours to get powder of organic siloxane composite material containing polyaniline/carbon black (in network structure) for performing spectral analysis.

Fourier Transform Infrared (FT-IR) Analysis

Figure 2:
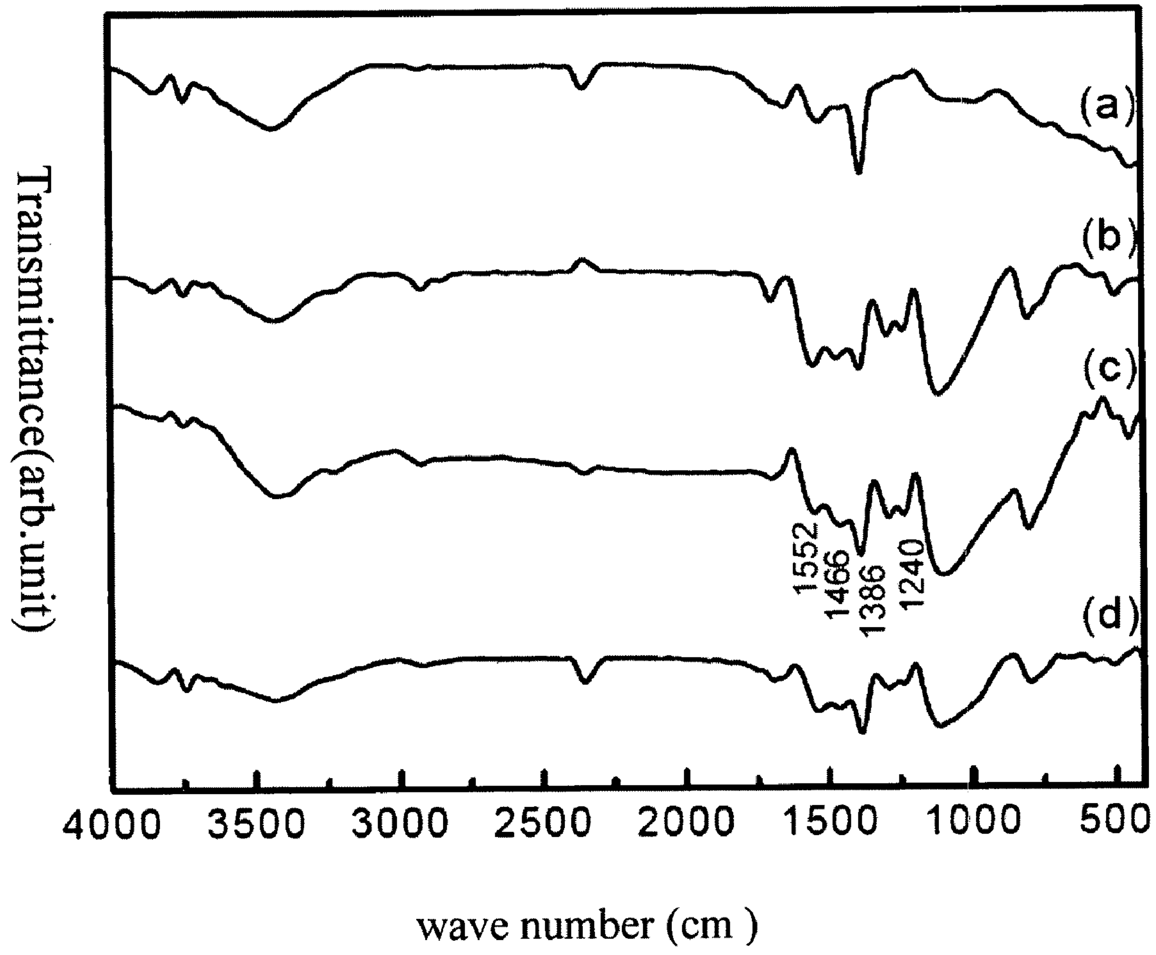
FIG. 2 is infrared spectra of polyaniline/carbon black composite material containing different weight ratio of carbon black according to the present invention.

By means of Fourier Transform Infrared Spectrophotometer, it is proved that polyaniline is distributed in conductive carbon black. Refer to FIG. 2, (a) represents a spectral curve of polyaniline, (b) represents a curve of PANI/CB(10)-nano-scale carbon black is 10% of total weight of polyaniline/carbon black, (c) represents a curve of PANI/CB(20) which means nano-scale carbon black is 20% of total weight of polyaniline/carbon black, and (d) represents a curve of PANI/CB(30) which means nano-scale carbon black is 30% of total weight of polyaniline/carbon black. Refer to curve (a), there is a vibration absorption peak of N—H of polyaniline at 3460 $cm^{-1}$ while two absorption peaks near 1552 and 1466 $cm^{-1}$ are respectively of quinoid ring (Q) and benzenoid ring (B) of polyaniline. The C—N stretching vibration peaks at 1386 and 1240 $cm^{-1}$ are of a Q-B-Q unit and a B-B-B unit. From to, intensity of absorption peak increases along with delocalized degrees and conductivity of the main chain. Thus absorption peak between 950-1110 $cm^{-1}$ is considered as characteristic peak in determining whether polyaniline is with conductivity or not and is called "electronic like band". From curve (b) to curve (d) in FIG. 2, above characteristic peak is observed. Thus it is proved that polyaniline exists in conductive carbon black.

Figure 3:
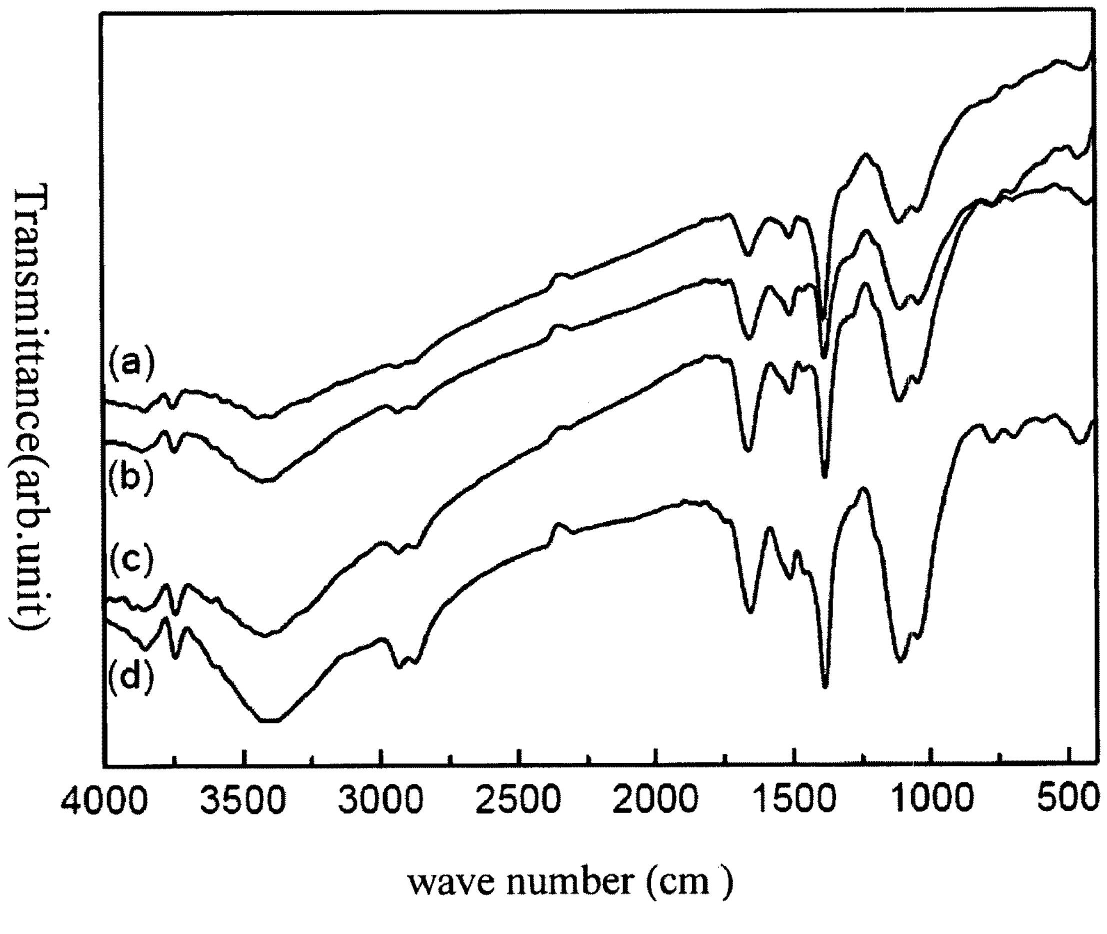
FIG. 3 is infrared spectra of PANI/CB(20) composite with various amount of PANI/CB composites being added to organic siloxane (Ormosil) according to the present invention.

Refer to FIG. 3, infrared spectra of organic siloxane (Ormosil) with various amount of PANI/CB composites are disclseod. Curve (a) represents Ormosil-PANI/CB(20)-30, curve (b) represents Ormosil-PANI/CB(20)-20, curve (c) represents Ormosil-PANI/CB(20)-10 and curve (d) represents Ormosil. The three characteristic absorption peaks of $SiO_2$ at 1110, 795 and 462 $cm^{-1}$ are respectively asymmetrical stretching, symmetrical stretching and bending vibration absorption of Si—O—Si. Peaks at 2936, 2867, 1660, 1465 and 1045 $cm^{-1}$ are characteristic absorption peaks of Ormosil. Peaks at 2936 and 2867 $cm^{-}$ are asymmetrical stretching vibration of C—H with various forms while peaks at 1660, 1465 and 1045 $cm^{-1}$ are vibration absorptions of C—C, N—H, C—N etc. Moreover, most of characteristic absorption peaks of PANI/CB(20) is overlapped with characteristic absorption peaks of Ormosil so that they are not so obvious. However, along with more amount of PANI/CB(20) composite being added, characteristic absorption peaks of Ormosil become weaker and weaker. This means that PANI/CB(20) composites are really distributed in Ormosil evenly.

Figure 4:
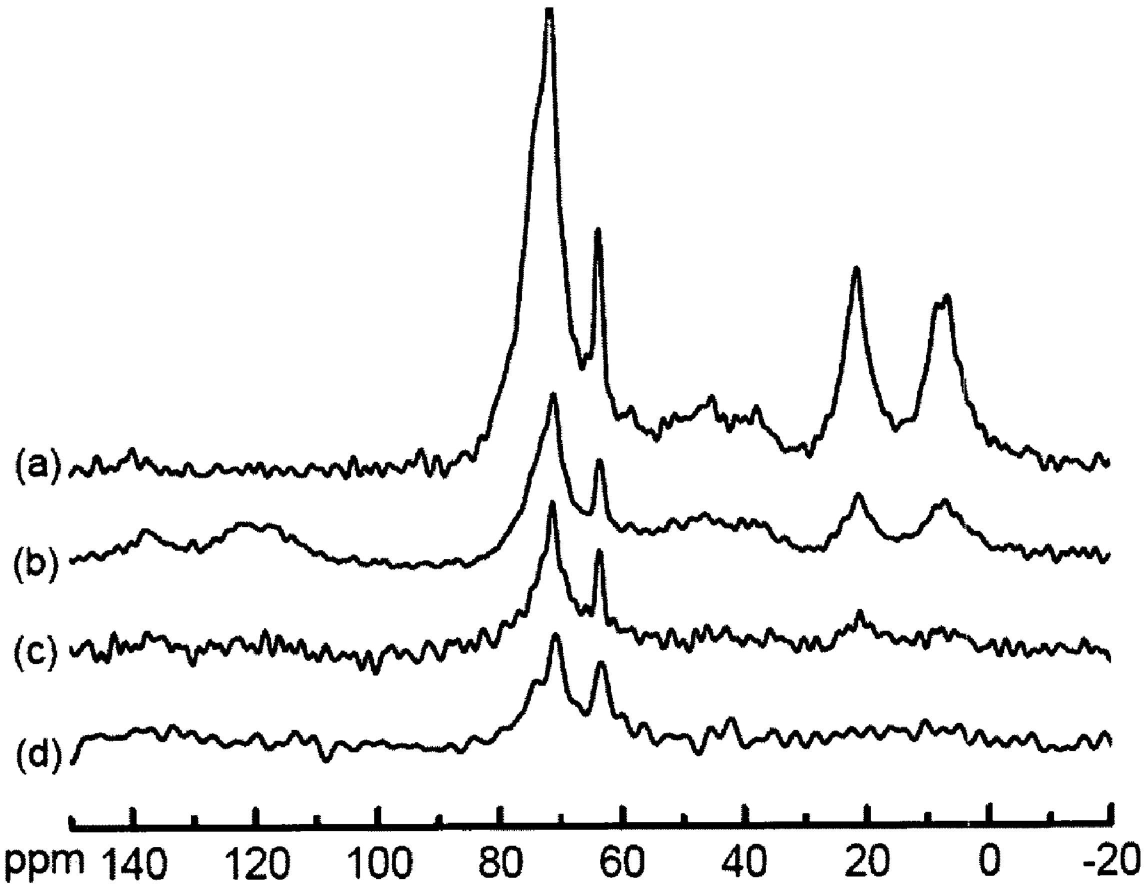
FIG. 4 is $^{13}$C-NMR spectra of Ormosil-PANI/CB(10, 20, 30)-10 hybrids according to the present invention.
Figure 5:
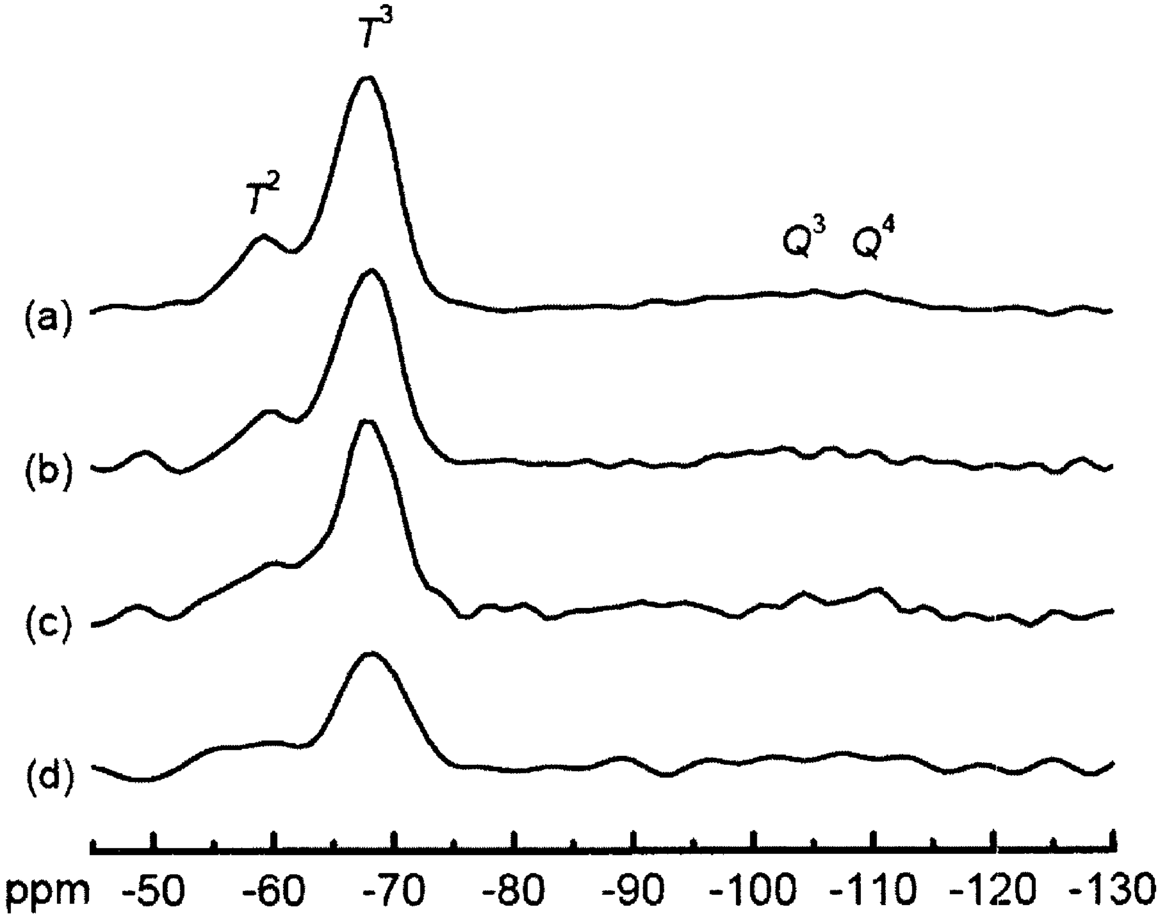
FIG. 5 is $^{29}$Si-NMR spectra of Ormosil-PANI/CB(10, 20, 30)-10 hybrids according to the present invention.

Refer to FIG. 4 & FIG. 5, ¯C-NMR spectra and $^{29}$Si-NMR spectra of Ormosil-PANI/CB(10, 20, 30)-10 hybrids are revealed respectively while curve (a) represents spectrum of Ormosil, curve (b) is spectrum of Ormosil-PANI/CB(10)-10, curve (c) is spectrum of Ormosil-PANI/CB(20)-10 and curve (d) is Ormosil-PANI/CB(30)-10. Organic segment structure of Ormosil analyzed by ¯C CP/MAS NMR spectra is as following: 7 ppm [Si—$CH_2$], 21 ppm [Si—$CH_2CH_2$], 63 ppm [Si—$CH_2CH_2CH_2$—O—$CH_2$CH—OR; alkoxy alcohol peak], 71-74 ppm [Si—$CH_2CH_2CH_2$—O—$CH_2$CH—O—Si]. After being added with 10 wt. % PANI/CB(10, 20, 30) composites, besides above characteristic absorption peals of Ormosil, absorption peak of C in benzenoid ring of polyaniline appears within 120~140 ppm area. Along with increasing amount of carbon black added in PANI/CB(10, 20, 30) composites, spectra signal becomes weaker. This means interference from conductive composites is stronger. Inorganic segment structure analyzed by $^{29}$Si CP/MAS NMR spectra is as following: −60 ppm [$T^2$; R—Si $(OSi)_2(OH)$]; —69 ppm [$T^3$; R—$Si(OSi)_3$]; −102 ppm [$Q^3$; $Si(OSi)_3(OH)$]; −112 ppm [$Q^4$; $Si(OSi)_4$]. The main element is $T^3$ while weak signals of $Q^3$ and $Q^4$ are caused by less amount of TEOS in the hybrid. Similarly, along with increasing amount of carbon black added and PANI/CB(10, 20, 30) composites added, spectra signal becomes weaker. This is due to that conductive PANI/CB composites are distributed in network silica so that energy of carbon or silicon is transmitted to PANI with resonance structure quickly. Therefore, the signal decays and gets weaker.

Figure 6:
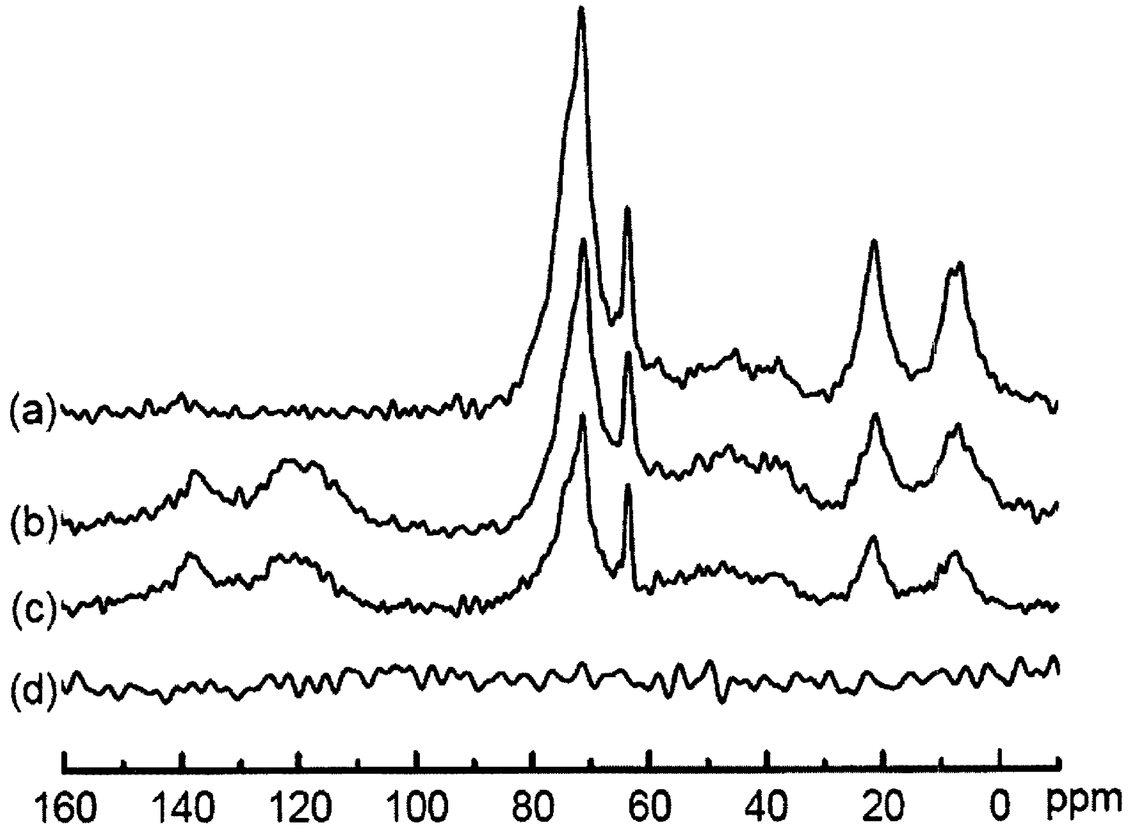
FIG. 6 is $^{13}$C-NMR spectra of Ormosil-PANI/CB(10)-10, -20, -30 hybrids according to the present invention.
Figure 7:
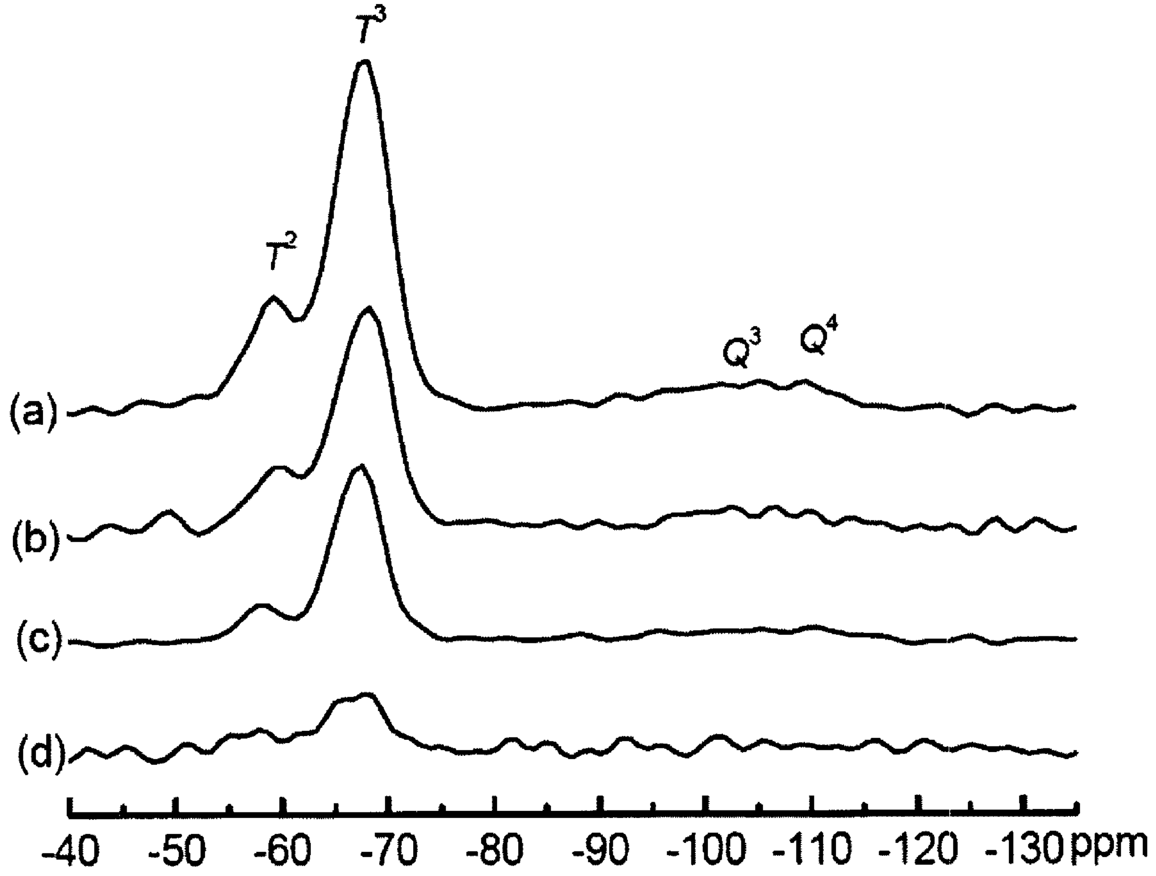
FIG. 7 is $^{29}$Si-NMR spectra of Ormosil-PANI/CB(10)-10, -20, -30 hybrids according to the present invention.

Refer to FIG. 6 & FIG. 7, $^{13}$C-NMR spectra and $^{29}$Si-NMR spectra of Ormosil-PANI/CB(10)-10, -20, -30 hybrids are revealed respectively while curve (a) represents spectrum of Ormosil, curve (b) is spectrum of Ormosil-PANI/CB(10)-10, curve (c) is spectrum of Ormosil-PANI/CB(10)-20 and curve (d) is Ormosil-PANI/CB(10)-30. Besides existence of $^{13}$C CP/MAS NMR characteristic absorption peaks of organic segment and inorganic segment of PANI and Ormosil, $^{13}$C- and $^{29}$Si-NMR spectral signals become weaker under influence of conductive composite along with increasing amount of PANI/CB(10) added (from 10 to 30 wt. %). Especially when 30 wt. % PANI/CB is added, there is no signal measured. This means PANI/CB has great absorption capability of NMR spectra energy. At the same time, it is proved that PANI/CB conductive composite exists. The result shows that Ormosil-PANI/CB hybrid coating has good electromagnetic wave absorption property. Furthermore, infrared thermography and microwave absorption experiment are also done. During cross-polarization processes, in rotation coordinate system, spinning of $^1$H and $^{29}$Si are locked and brought into thermal contact with each other for energy exchange while respective spin system also exchanges energy with surroundings (lattice). $^{29}$Si resonance spectroscopy of samples with different contact time and difference between chemical shifts all reflect partial dynamic change of cross-polarization. It changes along with shift of absorption peaks and structure difference of silicon atoms. Thus an equation (1) is used to describe relationship between contact time and signal strength.

$$M_c(t)=M_e[\exp(-t/T_{1\rho}^{H})-\exp(-t/T_{SiH})] \quad (1)$$

wherein is got from signal balance between $^1$H and $^{29}$Si, $T_{SiH}$ is for fixing contact time and energy exchange time of $^1$H and $^{29}$Si internuclear spin system, $T^H_{1\rho}$is a proton exchanging energy with surroundings (lattice) in rotation coordinate system, that's spin-lattice relaxation time.

Figure 8:
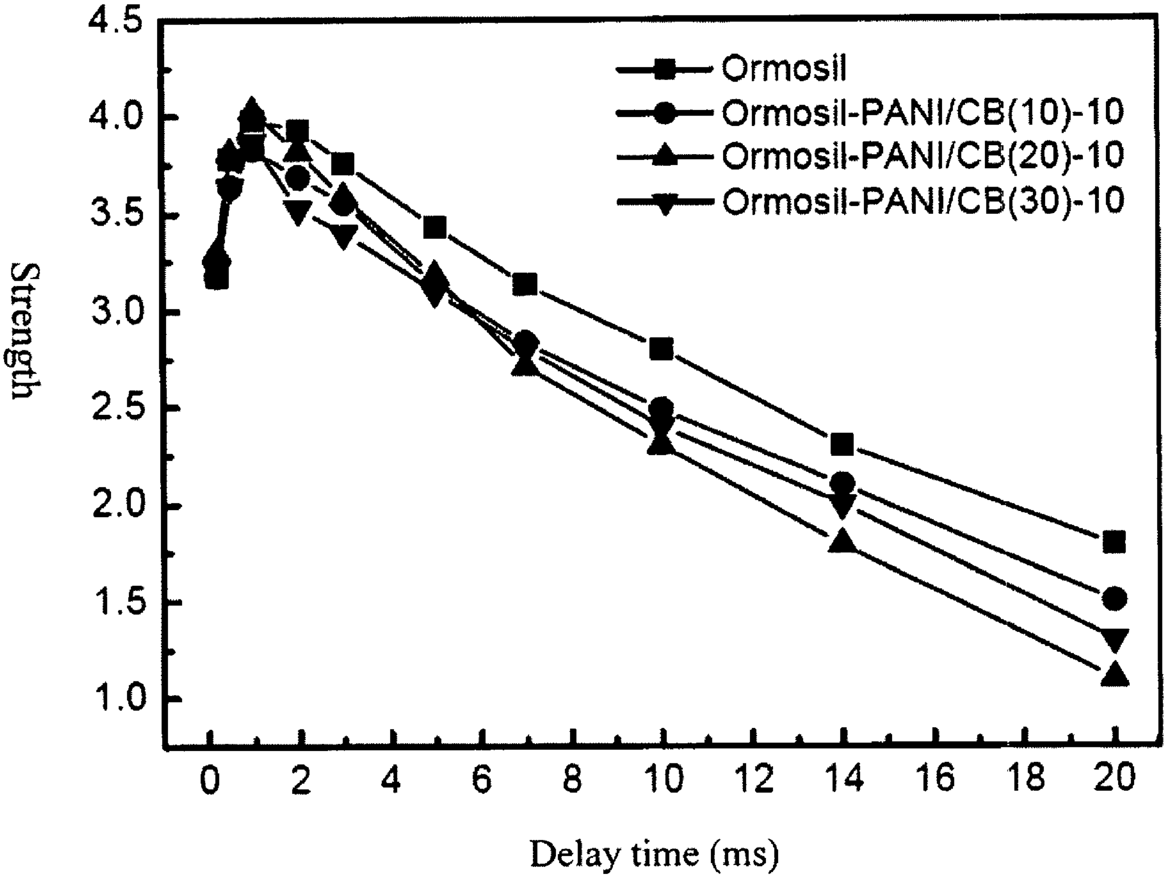
FIG. 8 is a semi-logarithmic graph of intensity of $^{29}$Si-NMR absorption peak of Ormosil and Ormosil-PANI/CB(10, 20, 30)-10 hybrids vs contact time.
Figure 9:
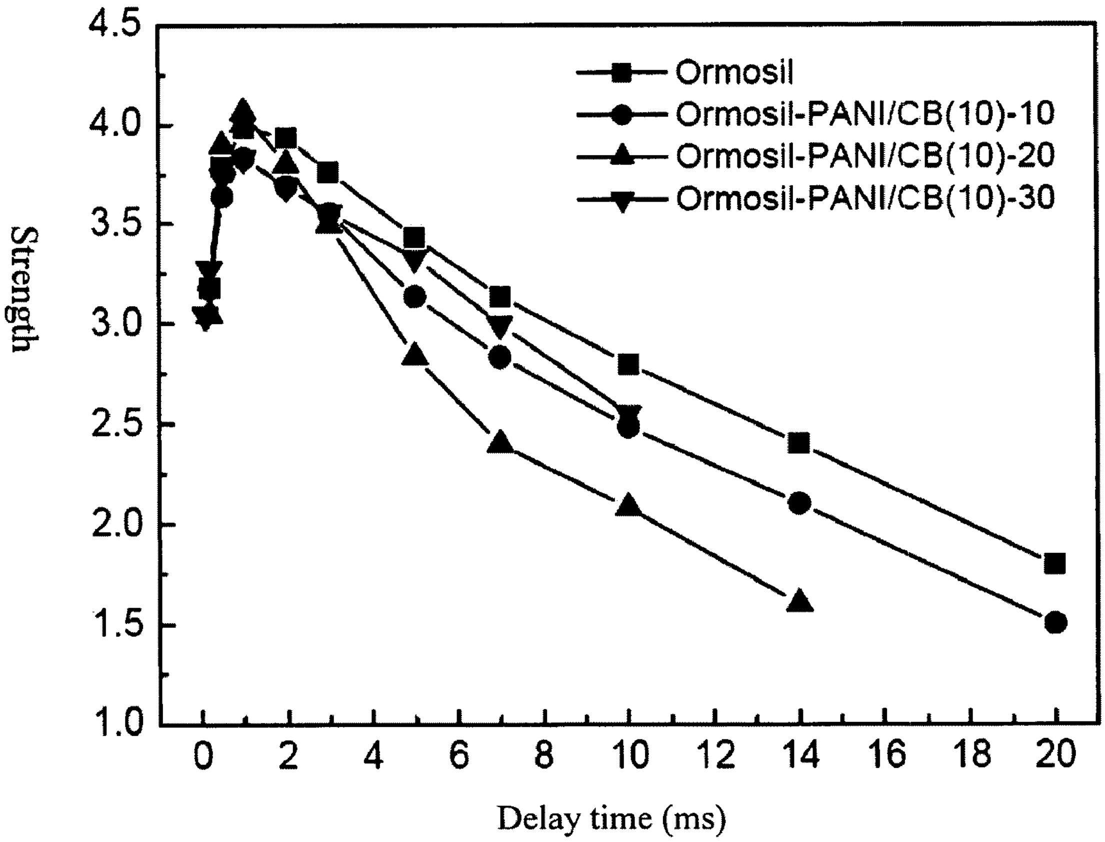
FIG. 9 is a semi-logarithmic graph of intensity of $^{29}$Si-NMR absorption peak of Ormosil and Ormosil-PANI/CB (10)-10, -20, -30 hybrids vs contact time.

FIG. 8 is a semi-logarithmic graph of intensity of $^{29}$Si-NMR absorption peak of Ormosil and Ormosil-PANI/CB(10, 20, 30)-10 hybrid vs contact time. FIG. 9 is a semi-logarithmic graph of intensity of $^{29}$Si-NMR absorption peak of Ormosil and Ormosil-PANI/CB(10)-10, -20, -30 hybrids vs contact time. By slopes of curves in FIG. 8 & FIG. 9, values of $T_{SiH}$ and $T^H_{1\rho}$are obtained, as shown in list 1. The value of TSiH represents transit speed of magnetic susceptibility of $^{29}$Si and $^1$H. The higher the $T_{SiH}$ value is, the slower the transit speed of magnetic susceptibility is. That means number and strength of coupling or interactive force of Si—H are reduced. Thus a lot more three dimensional network structure (Si—O—Si) exists.

The result shows that after adding 10 wt. % PANI/CB composite with 10-30 wt. % carbon black, $T_{SiH}$ value of inorganic segment ($T^3$) of hybrid is a lit larger than that of Ormosil. This means coupling strength of Si—H is reduced. At the same time, $T^H_{1\rho}$value of organic segment ($T^3$ structure) becomes smaller. This means spin diffusion of $^1$H is faster and mobility decreases for hybrid segment ($T^3$ structure), the structure is getting compact and harder. Similar results are got after adding PANI/CB(10)-10, -20, -30 composites. Thus addition of PANI/CB composites into Ormosil makes mobility of Ormosil segment decrease and the structure is more compact. Spin diffusion of $^1$H of Ormosil hybrid is fast and is evenly distributed to all relaxation. Thus, within $T_{1\rho}^H$ time, size of hybrid is smaller than spin diffusion path length. The spin diffusion path length (L) is calculated by a formula: $L=(6DT^H_{1\rho})^{1/2}$; D=0.6 nm$^2$/ms and results are listed in list 1. The results show that after addition of PANI/CB, spin diffusion path length of hybrid is decreased and this means that hybrid structure is more compact. This matches conclusion mentioned above. The results are further analyzed together with corrosion resistance so as to learn the correlation.

List 1 relaxation parameters of hybrids (values of $T_{SiH}$, $T^H_{1\rho}$ and L)

| sample | $T_{SiH}$ (ms) | $T^H_{1\rho}$ (ms) | L (nm) |
|---|---|---|---|
| Ormosil | 1.06419 | 8.67378 | 5.59 |
| Ormosil-PANI/CB(10)-10 | 1.29998 | 8.23520 | 5.44 |
| Ormosil-PANI/CB(20)-10 | 1.15812 | 6.44662 | 4.82 |
| Ormosil-PANI/CB(30)-10 | 1.28225 | 7.17515 | 5.08 |
| Ormosil-PANI/CB(10)-20 | 1.25126 | 5.88878 | 4.60 |
| Ormosil-PANI/CB(10)-30 | 1.20166 | 6.29325 | 4.76 |

UV-Vis Spectra Analysis

Figure 10:
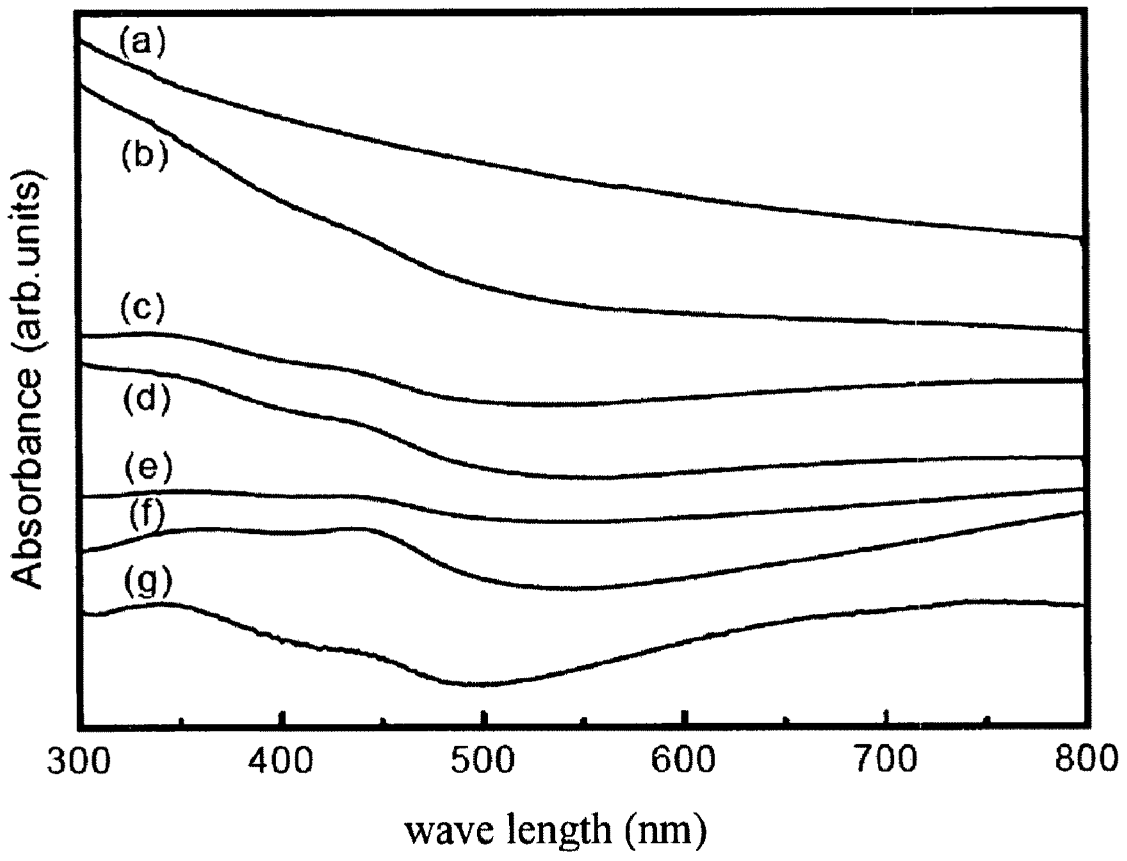
FIG. 10 is UV-Vis spectra of PANI/CB composite with various weight of carbon black according to the present invention.

Add PANI/CB composite into deionized water and apply ultrasonic vibration by a ultrasonic vibration device for 10 minutes to make composites disperse inside the deionized water. Then measure the solution by UV-Vis Spectrophotometer. Refer to FIG. 10, UV-Vis spectra of PANI/CB composite with various weight of carbon black is disclosed. Curve (a) is spectrum of nano-scale carbon black, curve (b) is spectrum of PANI/CB(30), curve (c) is spectrum of PANI/CB(20), curve (d) is spectrum of PANI/CB(15), curve (e) is spectrum of PANI/CB(10), curve (f) is spectrum of PANI/CB(5), and curve (g) is spectrum of PANI. It is observed in FIG. 10 that there is no absorption peak of carbon black between 300~800 nm. This is resulted from no conjugate electron pair of carbon black. While in liquid-phase UV-visible spectroscopy, there are three absorption peaks for PANI/CB core-shell composite. One peak at about 350 nm is absorption peak of π-π transition of benzenoid ring. The second shoulder-like peak is about at 450 nm and absorption after 600 nm keeps extending towards higher wavelength. Such absorption is caused by transition of cation-radical and polaron-bipolaron of main chain of polyaniline. That means quinoid ring (Q) and benzenoid ring (B) of polyaniline being doped by protic acid (such as HCl) so that electron ionization occurs and further results in conjugation between quinoid ring (Q) and benzenoid ring (B). Thus electrons have high mobility. This means PANI/CB composite is in the form of emeraldine salt which is a conducting (electron transfer) form. Furthermore, absorption peak near 450 nm shifts to lower wavelength area along with increasing amount of carbon black being added. This means oxidized unit of the composite increases along with the increasing amount of carbon black being added. This may be due to electron transfer force generated between the carbon black and the segments of polyaniline. This can also explain why conductivity of 7PANI/CB composite increases. Moreover, carbon black itself has no absorption in UV-visible spectroscopy. Thus along with increasing amount of carbon black being added, absorption peaks of PANI/CB composite near 350 nm and 450 nm are getting weaker. However, the characteristic absorption peaks still exist and this means polyaniline is electrically conductive emeraldine salt form.

X-Ray Diffraction Analysis

Figure 11:
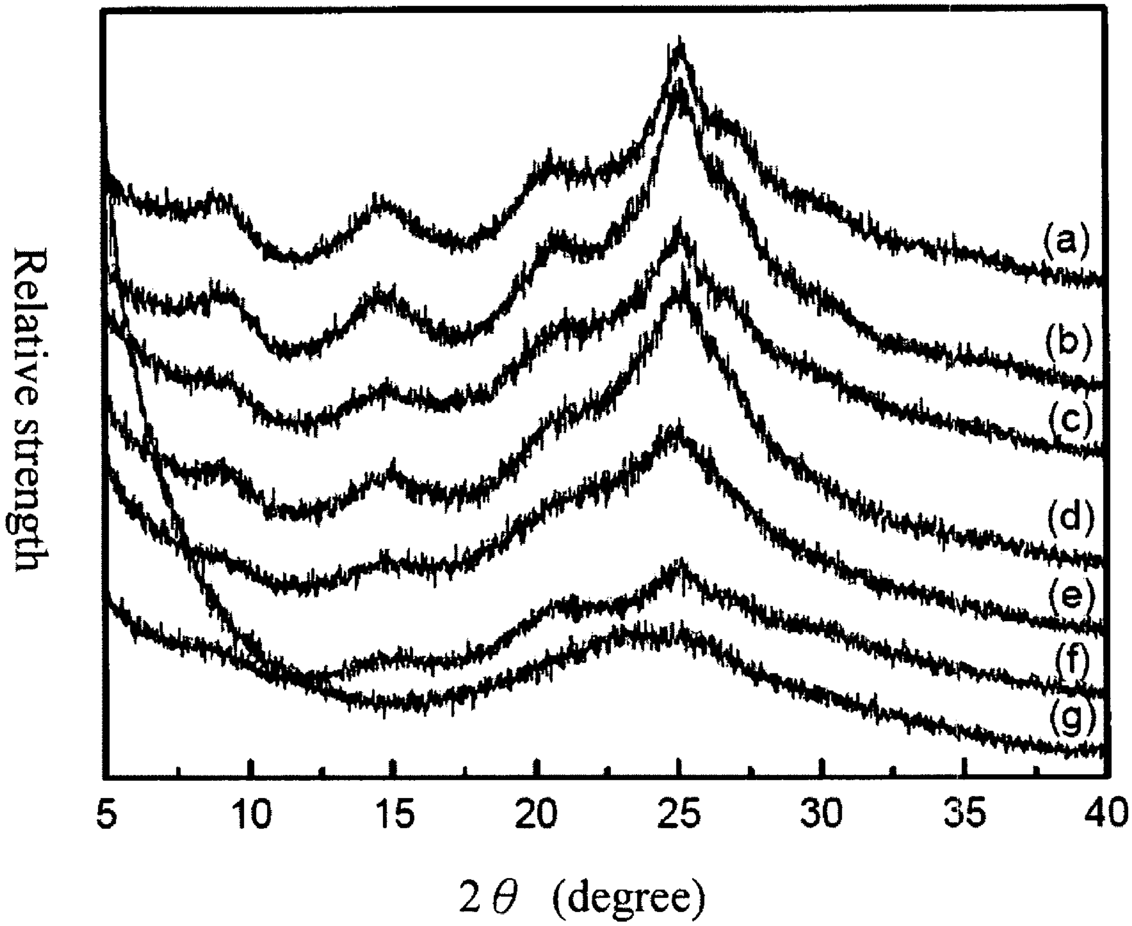
FIG. 11 is XRD (X-ray Diffraction) pattern of polyaniline/carbon black composite with various weight of carbon black according to the present invention.

Refer to FIG. 11, it shows XRD (X-ray Diffraction) pattern of polyamiline/carbon black composite with various weight of carbon black. Curve (a) is pattern of polyaniline (PANI), curve (b) is spectrum of PANI/CB(5), curve (c) is spectrum of PANI/CB(10), curve (d) is spectrum of PANI/CB(15), curve (e) is spectrum of PANI/CB(20), curve (f) is spectrum of PANI/CB(30), and curve (g) is spectrum of carbon black (CB). As to the curve of carbon black, a broad absorption peak appears at 2θ=24.3° and this means carbon black is in amorphous structure. This can be compared with TEM (Transmission electron microscopy) figure of carbon black described later. Moreover, absorption peaks of PANI/CB occur at 2θ=10°, 15°, 21°, 25°, so does the pattern of the curve of aniline. These are all characteristic absorption peaks of aniline. It will be seen from this that addition of carbon black doesn't not change crystal form of aniline. Yet along with increasing ratio of carbon black in aniline, each absorption peak of aniline becomes weaker and this means the amount of carbon black is over maximum amount of carbon black that aniline covers. Conversely, aniline is covered by carbon black. Similar result is shown by a SEM figure of PANI/CB described later. Once absorption peak of PANI/CB composite at 2θ=25° is higher than the peak at 2θ=21°, it is highly doped and is conducting emeraldine salt form.

Electron Paramagnetic Resonance (EPR) and Conductivity Analysis

Figure 12:
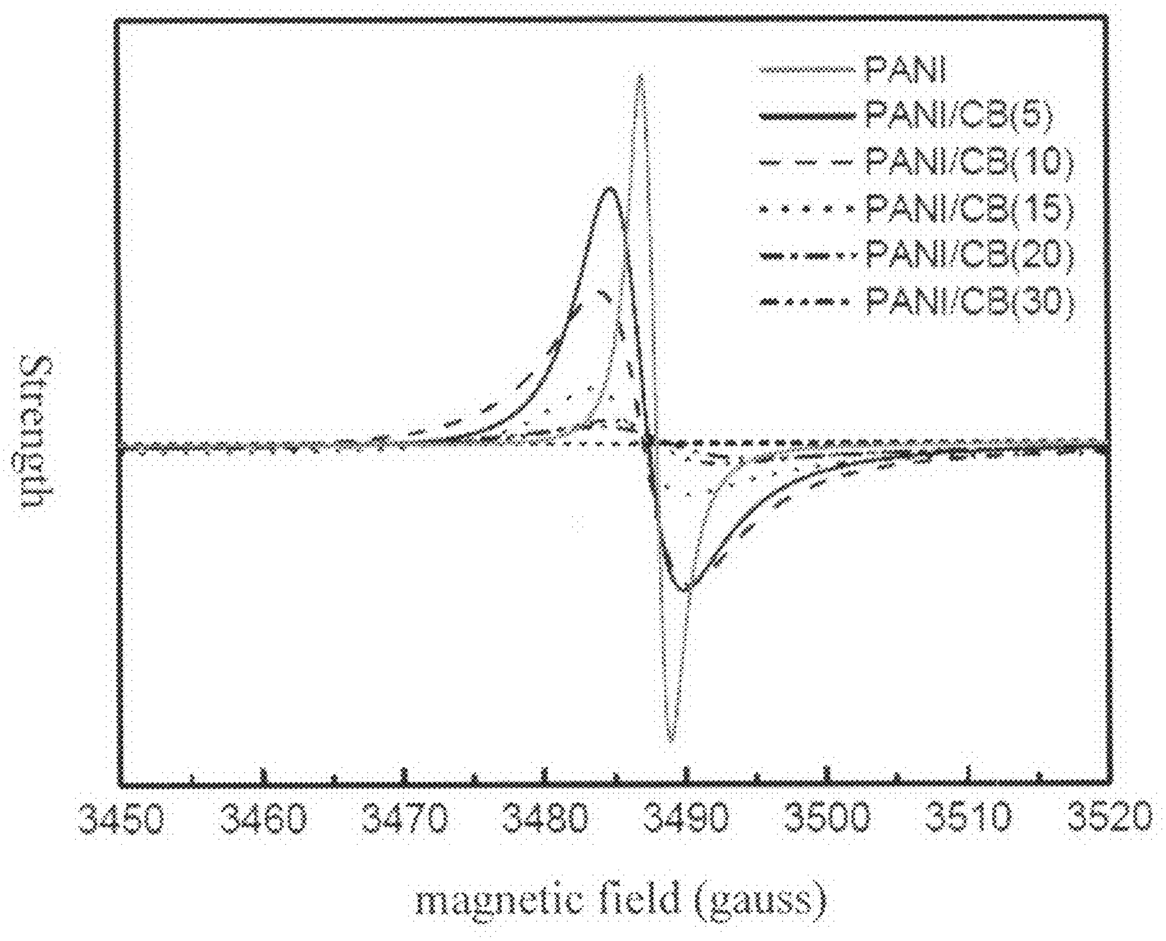
FIG. 12 is EPR spectroscopy of polyaniline/carbon black composite with various amount of carbon black according to the present invention.

By means of electron paramagnetic resonance, free electron in aniline and interaction between aniline and carbon black are discussed. Refer to FIG. 12, it is EPR spectroscopy of polyaniline/carbon black composite with various amount of carbon black. All data in spectra is analyzed by Lorentzian function-a distribution function. The line width ($\Delta H_{pp}$), values of g factor, values of spin concentration, and spin-spin relaxation times ($T_2$) are shown in list 2. Because carbon black has no free electron so that there is no absorption in EPR spectroscopy while other PANI/CB composite has similar pattern to EPR spectra of PANI.

By an equation (2), value of g factor of each sample is calculated and listed in list 2.

$$g=g_s-(\Delta H/H_0)g_s \quad (2)$$

(wherein $g_s$ is g value of reference material-DPPH, ΔH is difference of spectrum half-width (Full Width Half Height) between reference material and sample to be measured.

The g value of six carbons on pure aniline is about 2.0031 and the g value of one nitrogen is about 2.0054. Thus the arithmetic average of g value is about 2.0054. The g value of PANI/CB composite ranges from 2.0043 to 2.0050. That means free electrons of polyaniline in the composite are nearer to N—H bond and polyaniline in the composite is between Emeraldine salt form and Emeraldine base form. Along with increasing amount of carbon black being added, g value tends to increase. This means free electrons of polyaniline are localized near area around N—H bond by carbon black while this will not affect conductivity of composites. Refer to values of conductivity of PANI/CB composite in list 3, the higher ratio the carbon black is, the higher conductivity the PANI/CB composite has. This may be due to bridging effect of carbon black that compensates reduced conducting ability caused by transformation of polyaniline.

List 2 EPR parameters of PANI/CB composite at room temperature

| sample | $\Delta H_{pp}$ (G) | g value | $N_s$ (Spins/g) | $T_2$ (sec) |
|---|---|---|---|---|
| PANI | 1.073 | 2.0044 | $4.01 \times 10^7$ | $3.05 \times 10^{-8}$ |
| PANI/CB(5) | 5.164 | 2.0046 | $3.78 \times 10^9$ | $6.34 \times 10^{-9}$ |
| PANI/CB(10) | 6.336 | 2.0043 | $1.68 \times 10^{10}$ | $5.17 \times 10^{-9}$ |
| PANI/CB(15) | 6.922 | 2.0046 | $3.78 \times 10^{10}$ | $4.73 \times 10^{-9}$ |
| PANI/CB(20) | 7.508 | 2.0047 | $7.70 \times 10^{11}$ | $4.36 \times 10^{-9}$ |
| PANI/CB(30) | 10.988 | 2.0050 | $1.36 \times 10^{12}$ | $2.98 \times 10^{-9}$ |

Peak-to-Peak Linewidth, $\Delta H_{pp}$

As to solid samples, the following factors may have effect on the half-width thereof: (1) movement narrowing and fine splitting (2) interaction between unpaired electrons (including various types of transporting, fixing and movement ) (3) exchange narrowing. It is learned from list 2 that Linewidth of each composite at room temperature is larger (5.164→10.988 G) along with increasing amount of carbon black being added (PANI/CB(5)→PANI/CB(30)). And it's larger than line width of aniline (1.073 G). This means an interactive force exists between polyaniline and carbon black. Linewidth variance is under influence of interactions between electron spinning and surroundings, spinning motion or structural rearrangement of copolymer. Thus the linewidth of PANI/CB(30) is maximum due to large interaction between polyaniline and carbon black. This indirectly indicates that polyaniline and carbon black are doped with each other evenly so that interactive force is proportional to the amount of carbon black being added.

Spin Concentration; $N_s$

Area under EPR spectrum is about equal to $(\Delta H_{pp})^2$xh while h is height. Under the same conditions, use DPPH as reference material, number of unpaired spin electrons in the system is learned from area size. Refer to the list 2, electron spin concentration ($N_s$) of each composite from largest to smallest is PANI/CB(30)>PANI/CB(20)>PANI/CB(15)>PANI/CB(10)>PANI/CB(5)>PANI. Spin concentration of PANI/CB(30) is largest and this means this sample has more spin electrons than others and it is expected that PANI/CB (30) should have highest conductivity. Moreover, spin electrons of PANI is only 1/34000 of spin electrons of PANI/CB(30). It follows that addition of carbon black is helpful to generating spin electrons of polyaniline. The amount of carbon black being added is also related to the number of spin electrons generated. Along with increasing ratio of carbon black, spin concentration also increases and it is expected conductivity also becomes higher.

Spin-Spin Relaxation Time; $T_2$

A spin relaxation process is that an electron turns from high-energy state to low-energy state by electron transfer induction of similar electrons while a spin-spin relaxation is caused by energy difference between excited electron and electrons nearby and the spin-spin relaxation time ($T_2$) is determined by linewidth in accordance with equation (3):

$$\frac{1}{T_2} = \frac{g\beta\Delta H_{1/2}}{\eta},\ \Delta H_{1/2} = \sqrt{3}\,\Delta H_{pp} \quad (3)$$

wherein β is Bohr magneton ($9.274\times10^{-21}$ erg gauss$^{-1}$), $\Delta H_{1/2}$ is Full Width Half Height of absorption peak (gauss), and η is a constant ($1.054\times10^{-27}$ ergs).

Through the list 2, it is found that $T_2$ value of different PANI/CB composites with various amount of carbon black reduces from $6.34\times10^{-9}$ sec to $2.98\times10^{-9}$ sec (PANI/CB(5)→PANI/CB(30)) while PANI itself has highest T value ($3.05\times10^{-8}$ s). $T_2$ value is affected by different electronic environment. Due to different ratio of PANI/CB, various electronic environments are available. Therefore, it is indicated that spin-spin relaxation time is inversely proportional to linewidth and is reduced along with increasing of carbon black.

Conductivity

Polyaniline is a (quasi-one-dimensional conductive polymer. After protonation, polyaniline turns from insulating states into conducting states. In the present invention, polyaniline is doped with protonic acid such as hydrochloric acid so as to produce polyaniline in emeraldine salt form. The emeraldine salt of polyaniline is polymerized in the presence of carbon black to produce conductive composite material. Moreover, add conductive composites into organic modified siloxane (Ormosil) and measure resistance of the composite material. Calculate conductivity by equation (4).

$$\sigma=(1/R)\times(h/A) \quad (4)$$

In the equation (4), conductivity has the unit of siemens per centimeter S/cm, R is resistance (Ω), h and A are respectively thickness (cm) and area (cm$^2$) of a test piece. Refer to list 3, it is learned that conductivity of composites from largest to smallest is: CB>PANI/CB(30)>PANI/CB(20)>PANI/CB(15)>PANI/CB(10)>PANI/CB(5)>PANI. This is consistent with electron spin concentration ($N_s$). It follows that the larger the electron spin concentration is, the higher the conductivity is. Along with increasing ratio of carbon black, bridging effect is increased so that conductivity of composite is getting higher. After the composite being added into organic modified organic modified siloxane (Ormosil), the conductivity is reduced to 1%. This is due to that siloxane (Ormosil) is not conductive and addition of conductive polymer makes the siloxane have conductivity above $10^{-3}$ S/cm. According to the list 4, when PANI/CB composite is added into Ormosil, conductivity of mixtures increases along with ratio of carbon black in the composite or the amount of PANI/CB composite being added. Within the ratio ranging from 10-30%, non-conductive Ormosil is turned into another form with conductivity above $10^{-3}$ S/cm.

List 3 Values of conductivity of PANI/CB at room temperature

| sample | value of conductivity (S/cm) |
|---|---|
| PANI | 0.19969 |
| CB | 1.22301 |
| PANI/CB(5) | 0.20569 |
| PANI/CB(10) | 0.33878 |
| PANI/CB(15) | 0.47329 |
| PANI/CB(20) | 0.63226 |
| PANI/CB(30) | 0.84523 |

List 4 Values of conductivity of Ormosil-PANI/CB at room temperature

| sample | value of conductivity (S/cm) |
|---|---|
| Ormosil-PANI/CB(10)-10 | 0.002419 |
| Ormosil-PANI/CB(20)-10 | 0.004635 |
| Ormosil-PANI/CB(30)-10 | 0.007530 |
| Ormosil-PANI/CB(10)-20 | 0.002593 |
| Ormosil-PANI/CB(20)-20 | 0.005157 |
| Ormosil-PANI/CB(30)-20 | 0.006077 |
| Ormosil-PANI/CB(10)-30 | 0.003816 |
| Ormosil-PANI/CB(20)-30 | 0.005652 |
| Ormosil-PANI/CB(30)-30 | 0.008980 |

Figure 13:
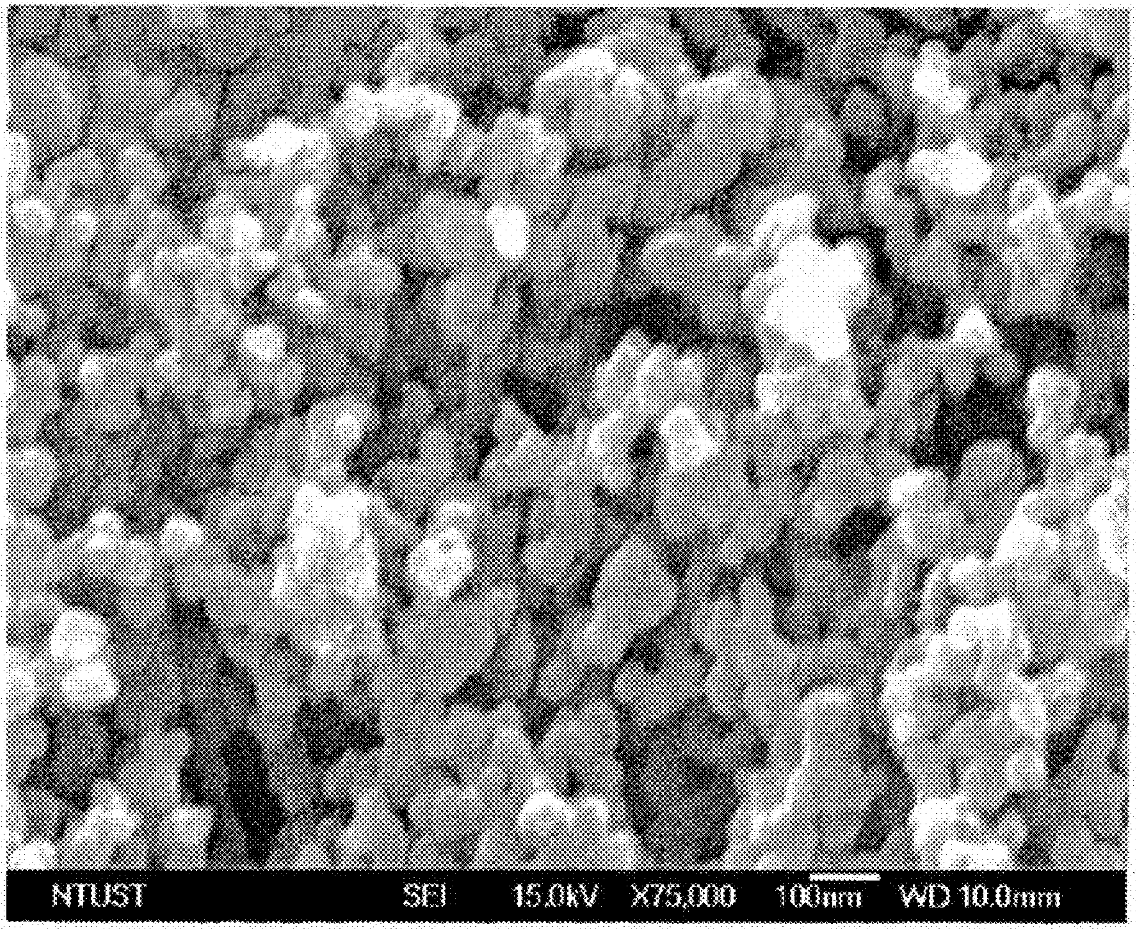
FIG. 13 is a scanning electron microscope (SEM) image of nano-scale carbon black (CB) according to the present invention.
Figure 14A:
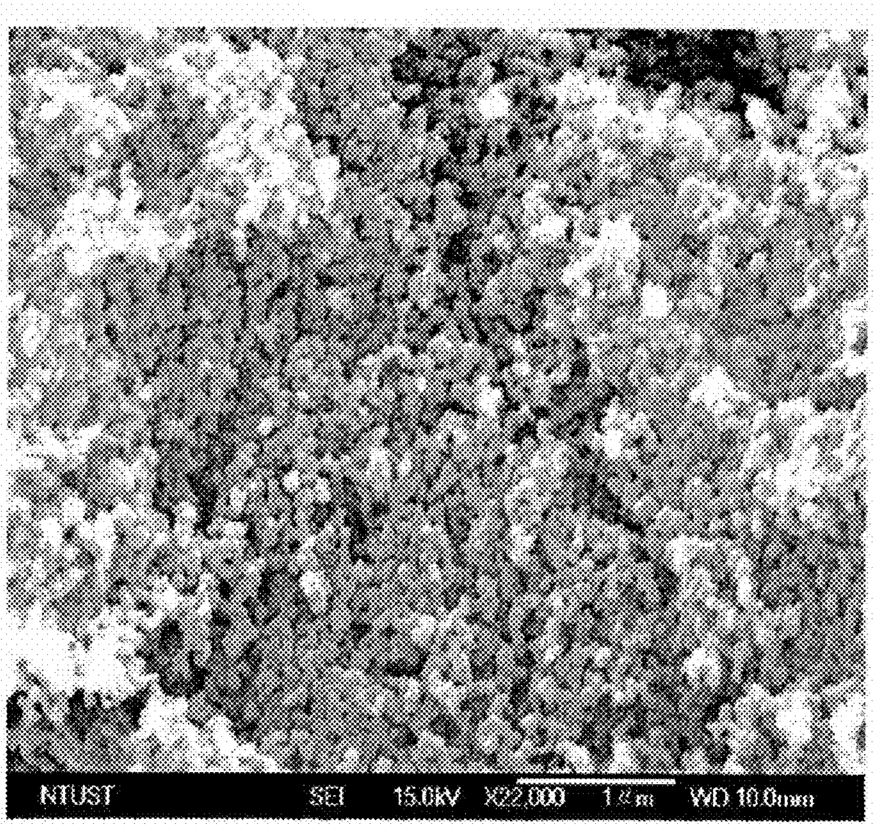
FIG. 14A is another SEM image of nano-scale carbon black (CB) according to the present invention.
Figure 14B:
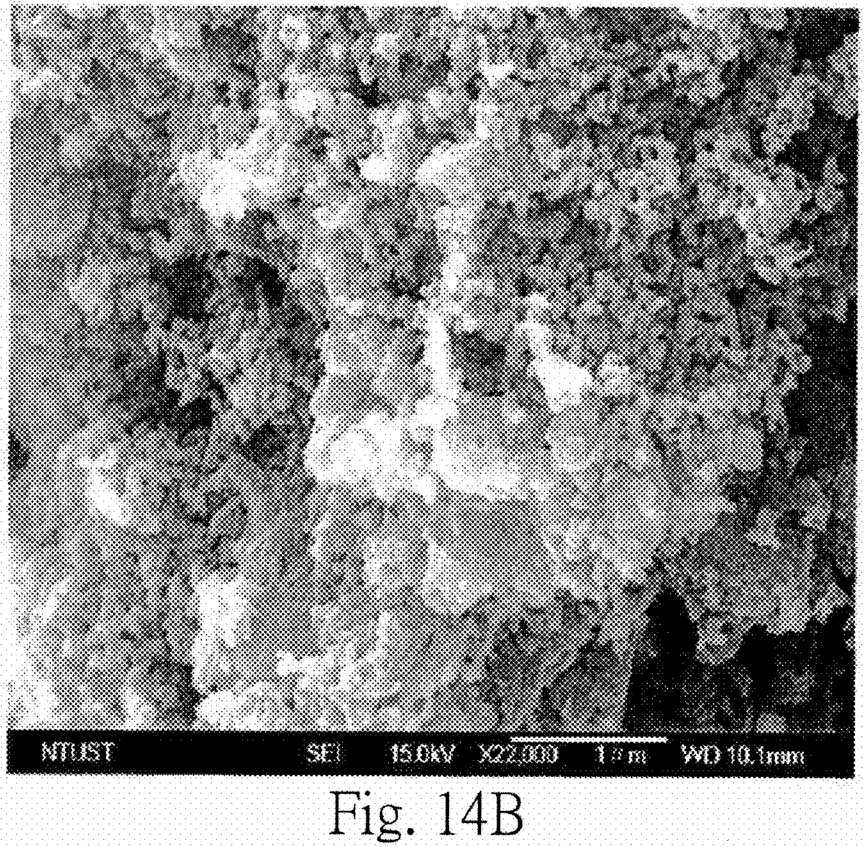
FIG. 14B is a SEM image of PANI/CB(30) according to the present invention.
Figure 14C:
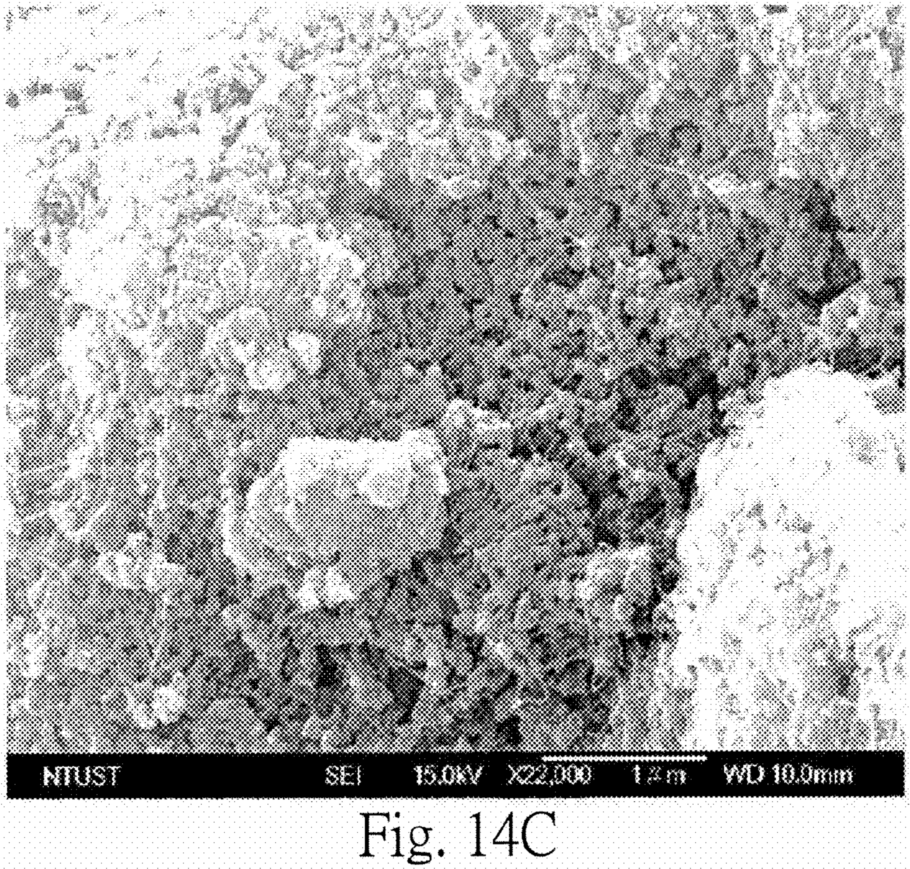
FIG. 14C is a SEM image of PANI/CB(20) according to the present invention.
Figure 14D:
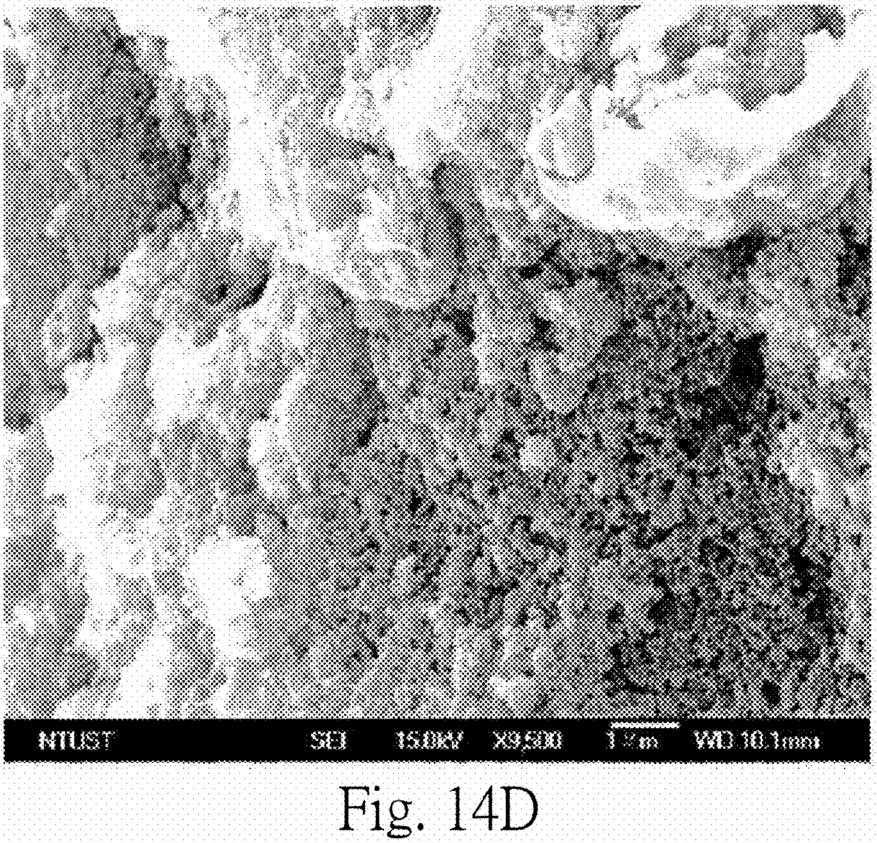
FIG. 14D is a SEM image of PANI/CB(10) according to the present invention.

Scanning Electron Microscope (SEM) and Transmission Electron Microscope (TEM) Analysis Refer to FIG. 13, it is a scanning electron microscope (SEM) image of carbon black and average diameter of its particle is from 10 to 80 nm. Although there are some clusters formed by aggregation of part of particles, it is proved that the carbon black is in nano-scale. Refer from FIG. 14A to FIG. 14D, respectively are SEM images of CB, PANI/CB(30), PANI/CB(20) and PANI/CB(10). The length of scale on bottom of each figure is 1 μm. In FIG. 14D, it is found that polyaniline covers the carbon black evenly. Yet along with increasing amount of carbon black being added, carbon black exposed outside polyaniline is getting more, as shown in FIG. 14B. Thus it is supposed that after addition of 20% of carbon black, there is over-saturation. From FIG. 14A to FIG. 14D, threadlike polyaniline is observed. This may be caused by connection of conductive channels and further a conductive network is formed. This leads to higher conductivity of composites.

Figure 15A:
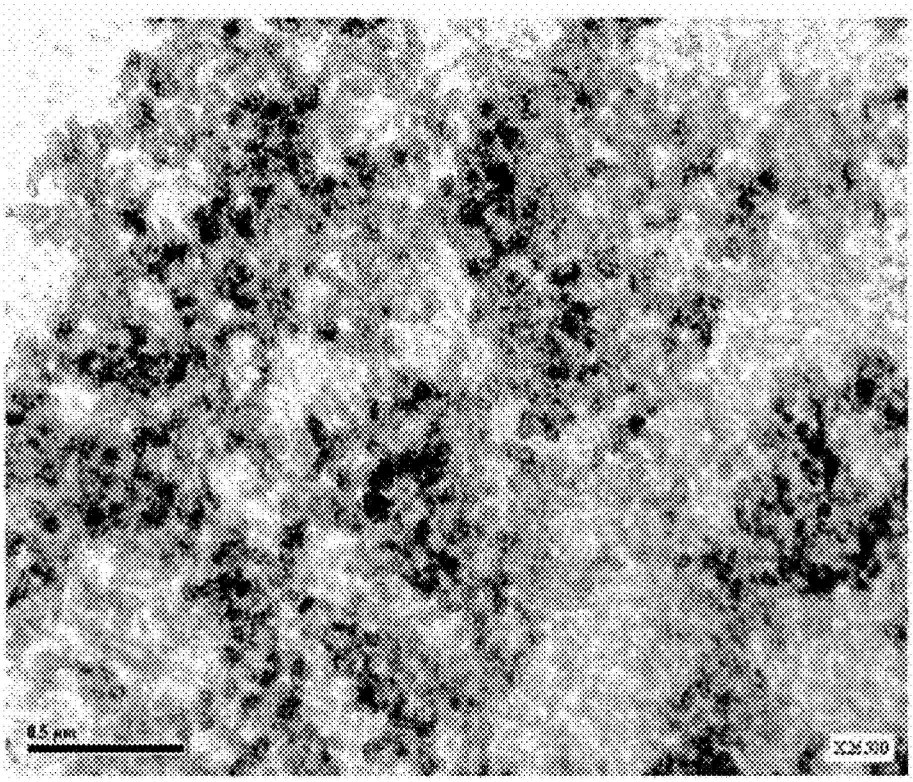
FIG. 15A is a TEM figure of CB according to the present invention.
Figure 15B:
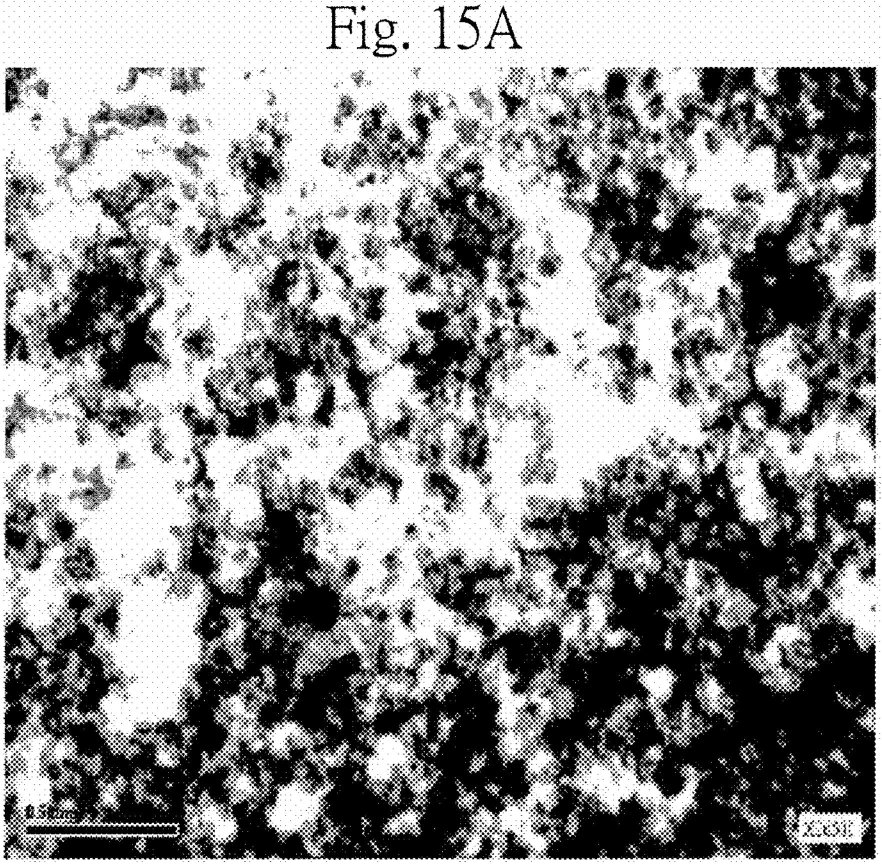
FIG. 15B is a TEM image of PANI/CB(30) according to the present invention.
Figure 15C:
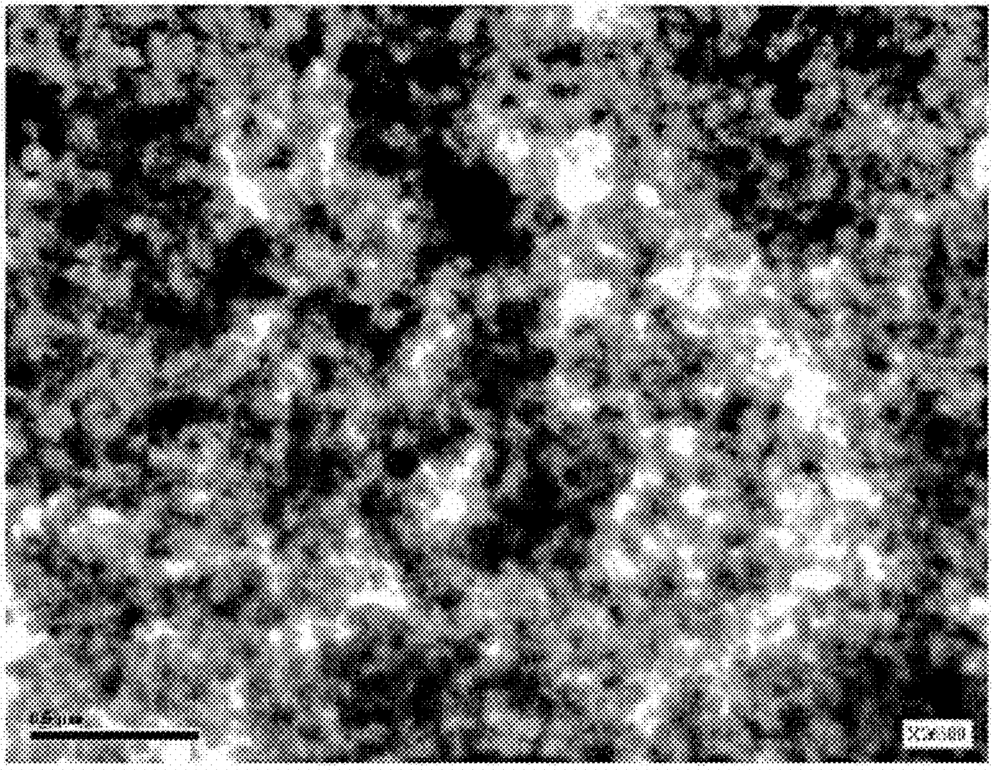
FIG. 15C is a TEM image of PANI/CB(20) according to the present invention.
Figure 15D:
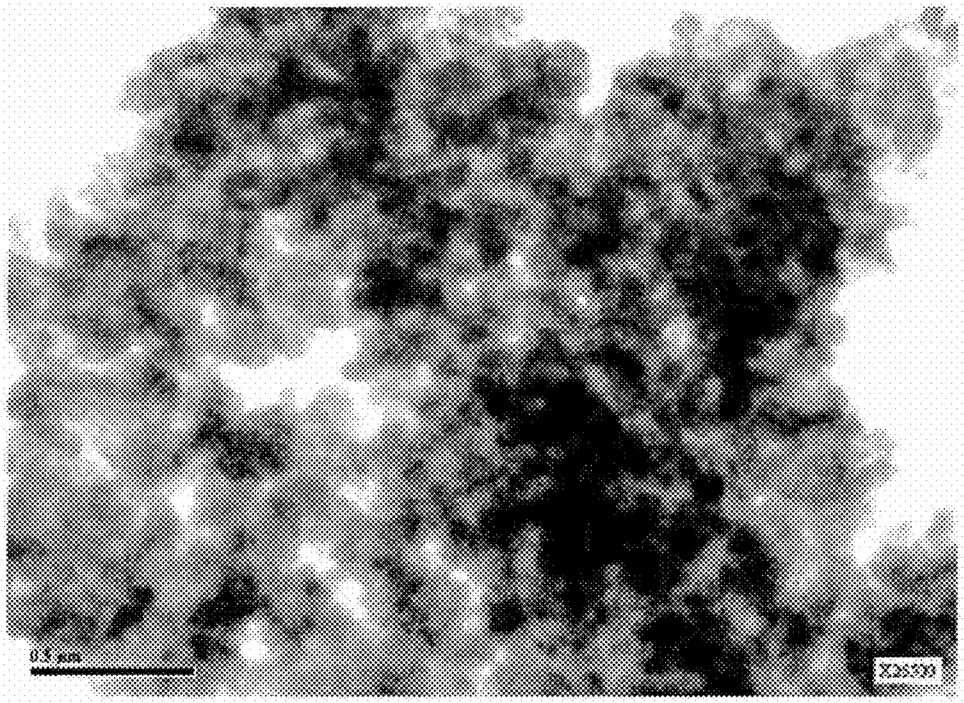
FIG. 15D is a TEM image of PANI/CB(10) according to the present invention.

Refer from FIG. 15A to FIG. 15D, respectively are TEM figures of CB, PANI/CB(30), PANI/CB(20) and PANI/CB (10). The length of scale on bottom of each figure is 0.5 μm. It is observed that either distribution of carbon black or covering of polyaniline is quite ideal and there is no mass. Thus an evenly conductive network is formed so that conductivity of the composite is increased. In FIG. 15D, the darker area is carbon black while the lighter area is polyaniline. This figure shows that the polyaniline covers the carbon black. Yet from FIG. 15A to FIG. 15C, along with increasing amount of carbon black being added, carbon black distributed outside polyaniline is getting more. This result can be compared with SEM images in FIG. 15A to FIG. 15C. Therefore, observe the microstructure, structure and distribution of PANI/CB(20) are most perfect and it has adequate conductivity without decreasing mechanical property and processability.

Thermogravimetric (TGA) Analysis

Figure 16A:
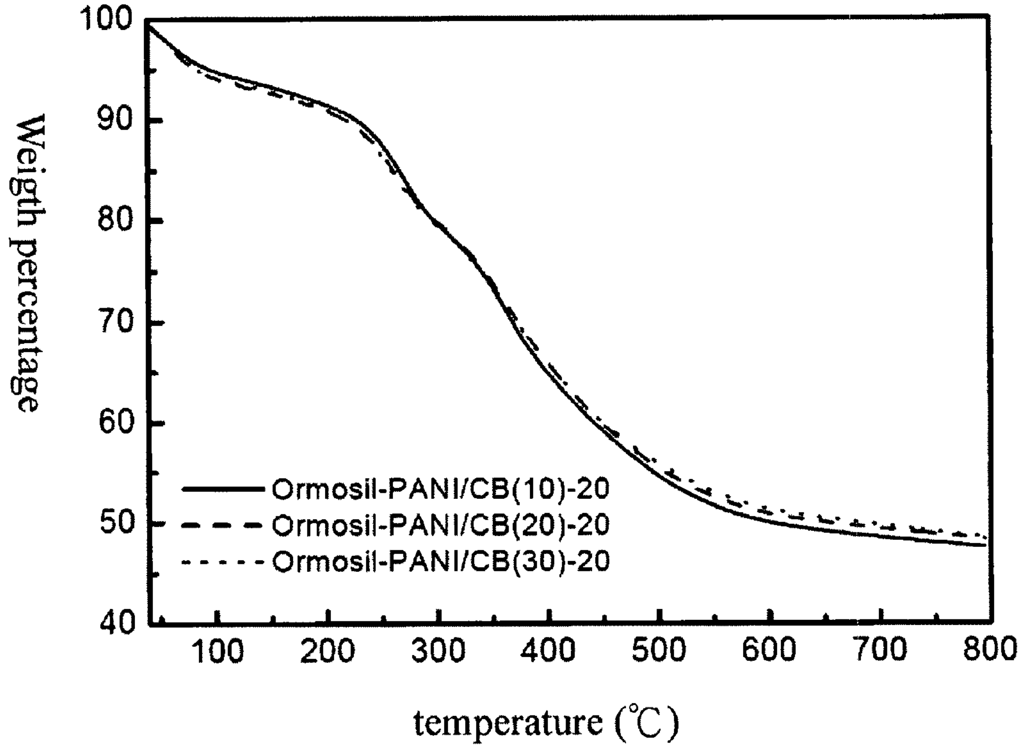
FIG. 16A is thermogravimetric (TGA) analysis in nitrogen of Ormosil-PANI/CB(10, 20, 30)-20 respectively according to the present invention.
Figure 16B:
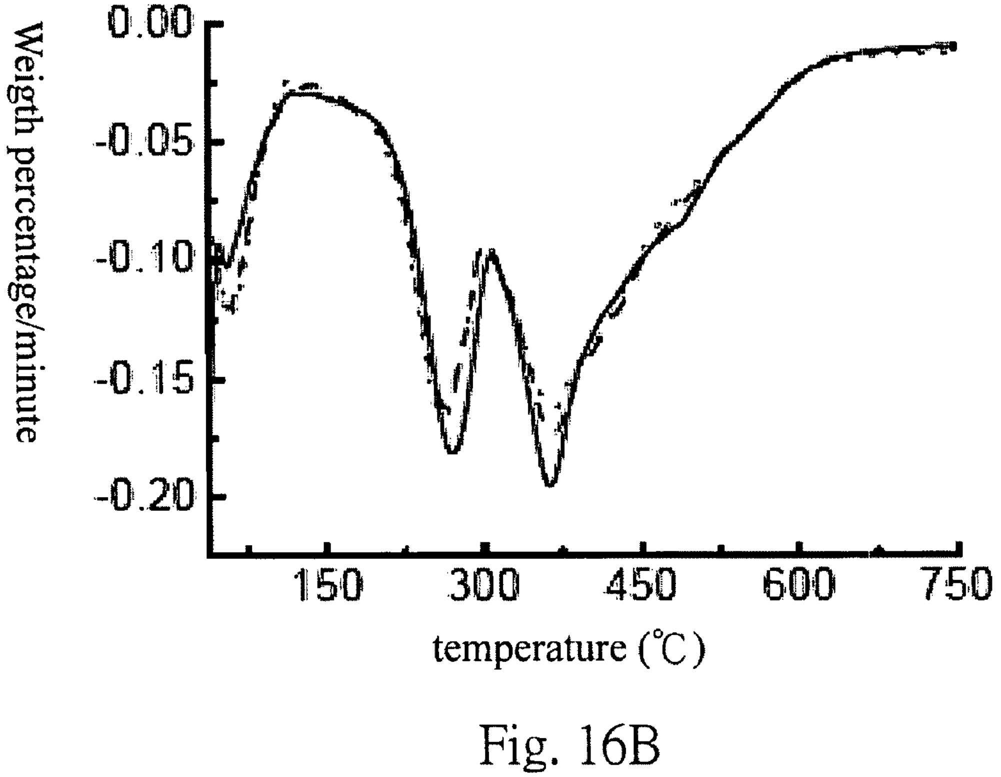
FIG. 16B shows derivative thermogravimetry (DTG) results of Ormosil-PANI/CB(10, 20, 30)-20 respectively in a nitrogen atmosphere according to the present invention.

FIG. 16A shows results of thermogravimetric analysis in nitrogen of 20 wt. % PANI/CB composite added in Ormosil coating with 10, 20 and 30 wt. % carbon black respectively. FIG. 16B shows derivative thermogravimetry (DTG) curves of 20 wt. % PANI/CB composite added in Ormosil coating with 10, 20 and 30 wt. % carbon black respectively in a nitrogen atmosphere. It is observed from the DTG figure that the degradation of the composite material is divided into four stages. The first stage is from 50 to 150° C. and this is dehydration reaction of absorbed water of composite material. In the second stage, weight loss occurs within temperature range from 170 to 300° C. This is due to degradation of fatty amine segments of curing agent and damage to structure of aniline. The third and the fourth stages are respectively within 300-380° C. and 380-600° C. for degradation of glycidylpropyl segments of GPTMS and degradation of silica network segments ($T^i$ and $Q^i$ structure). Moreover, TGA and DTG curve of hybrid of three composite Ormosil-PANI/CB(10, 20, 30)-20 are also similar, only with a little bit increasing of thermal stability (the degradation is retarded) and char yield caused by increasing amount of carbon black.

Figure 17A:
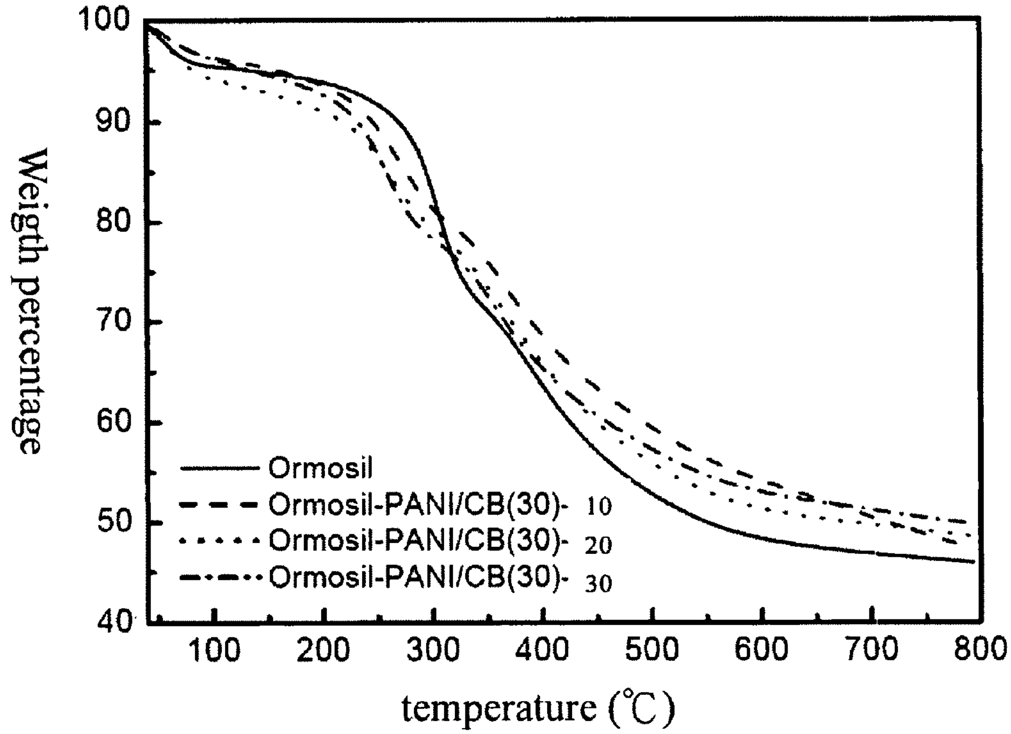
FIG. 17A is thermogravimetric (TGA) analysis in nitrogen of Ormosil and Ormosil-PANI/CB(30)-10, -20, -30 according to the present invention.
Figure 17B:
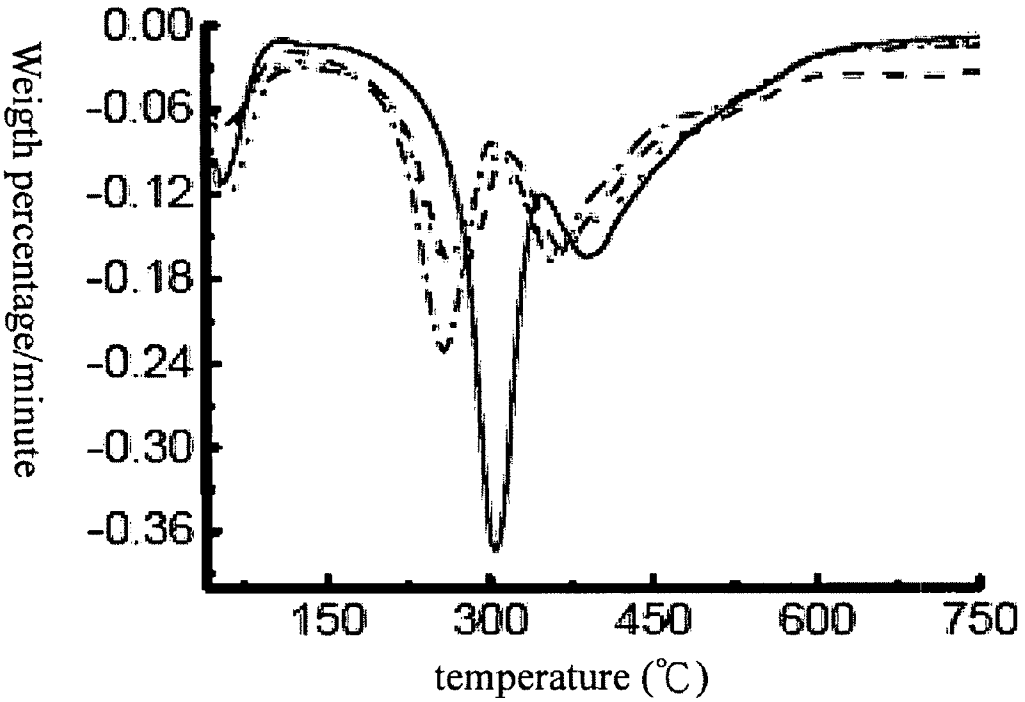
FIG. 17B shows derivative thermogravimetry (DTG) results of Ormosil and Ormosil-PANI/CB(30)-10, -20, -30 in a nitrogen atmosphere according to the present invention.

Refer to FIG. 17A, it shows results of thermogravimetric analysis in nitrogen of Ormosil and Ormosil-PANI/CB(30)-10, -20, -30 while FIG. 17B are derivative thermogravimetry (DTG) curves of Ormosil and Ormosil-PANI/CB(30)-10, -20, -30 respectively in a nitrogen atmosphere. It is observed from the figures that weight loss pattern of Ormosil-PANI/CB(30)-10, -20, -30 composite is similar like the way mentioned above. But degradation temperature of the composites before 300° C. seems lower than that of Ormosil. This should be resulted from earlier degradation of polyaniline. After the temperature over 300° C., degradation rate of Ormosil-PANI/CB slows down while char yield increases. This represents that after addition of PANI/CB composite, network structure of Ormosil becomes more compact and thermal stability increases. Furthermore, at 800° C., percent ratio of char yield of Ormosil-PANI/CB is Ormosil-PANI/CB(30)-30>Ormosil-PANI/CB(30)-20>Ormosil-PANI/CB(30)-10>Ormosil. This is due to that organic matter and inorganic matter such as carbon black are not burned completely to form char residue under protection of nitrogen gas. Thus burning rate is indirectly turned down. Therefore, the more amount of PANI/CB being added, the more amount of char residue generated at 800° C.

Figure 18A:
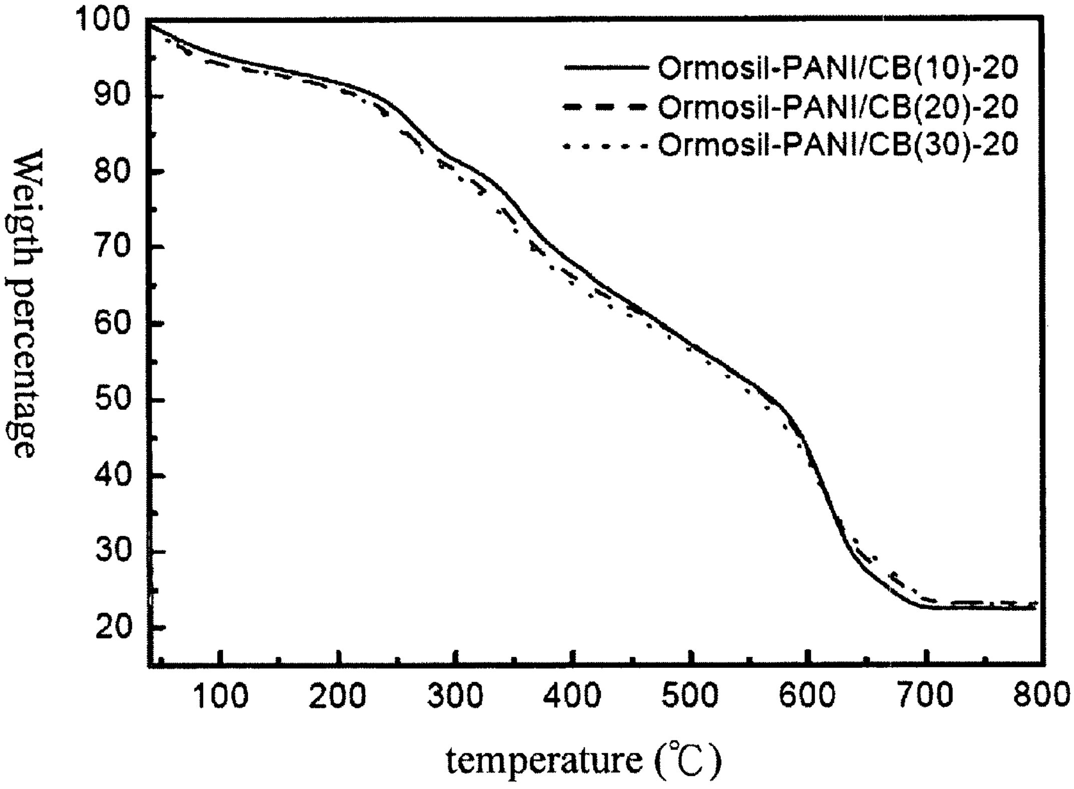
FIG. 18A is thermogravimetric (TGA) analysis in air of Ormosil-PANI/CB(10, 20, 30)-20 respectively according to the present invention.
Figure 18B:
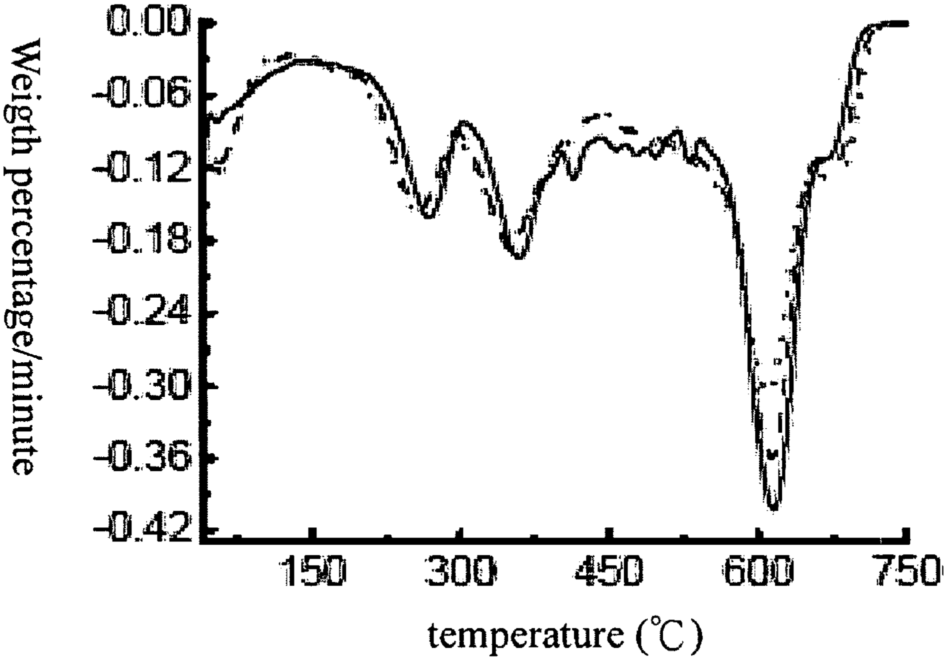
FIG. 18B shows derivative thermogravimetry (DTG) results of Ormosil-PANI/CB(10, 20, 30)-20 respectively in air according to the present invention.

Refer to FIG. 18A, it shows results of thermogravimetric analysis in air of Ormosil-PANI/CB(10, 20, 30)-20 while FIG. 18B are derivative thermogravimetry (DTG) curves of Ormosil-PANI/CB(10, 20, 30)-20 respectively in air. The degradation is divided into four stages, respectively are 50~100° C., 200~300° C., 300~430° C. and 550~700° C. The stages in sequence are dehydration, thermal-oxidative degradation of polyaniline, glycidylpropyl segments and silica network segments. It's similar to degradation stages under nitrogen atmosphere while char yield is obviously reduced.

Figure 19A:
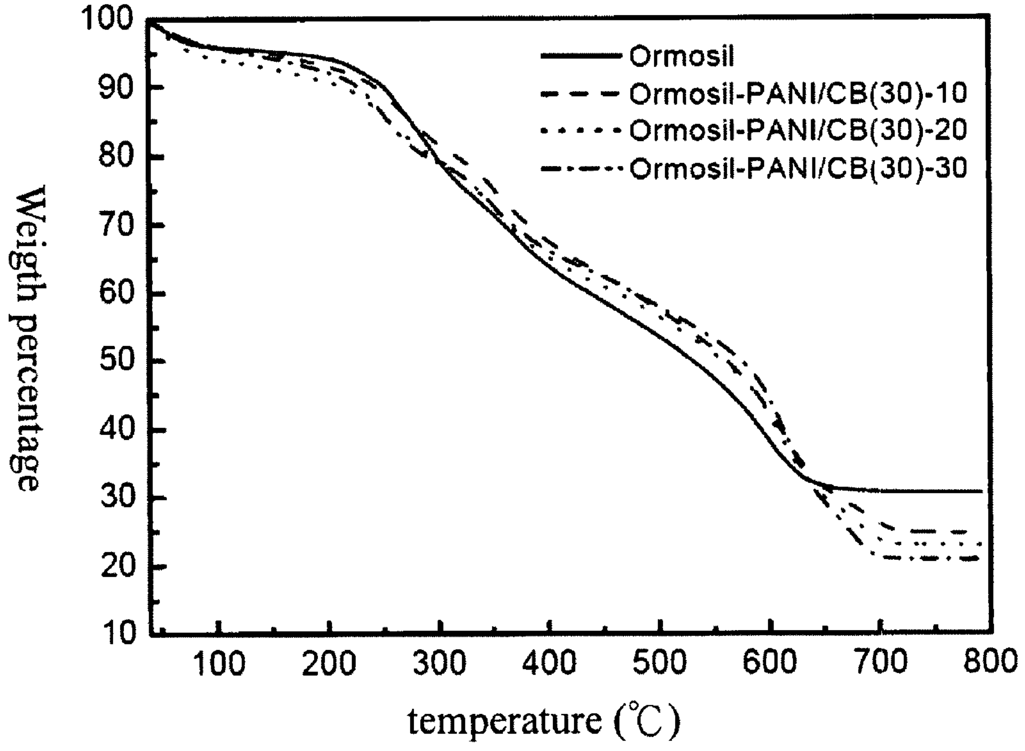
FIG. 19A is thermogravimetric (TGA) analysis in air of Ormosil and Ormosil-PANI/CB(30)-10, -20, -30 according to the present invention.
Figure 19B:
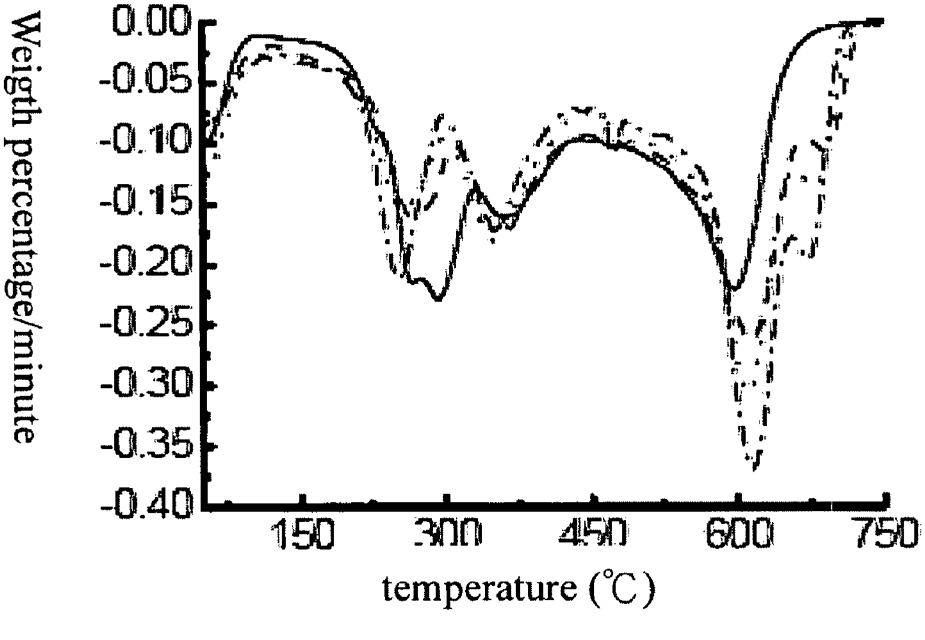
FIG. 19B shows derivative thermogravimetry (DTG) results of Ormosil and Ormosil-PANI/CB(30)-10, -20, -30 in air according to the present invention.

Refer to FIG. 19A, it shows results of thermogravimetric analysis in air of Ormosil and Ormosil-PANI/CB(30)-10, -20, -30 while FIG. 18B are derivative thermogravimetry (DTG) curves of Ormosil and Ormosil-PANI/CB(30)-10, -20, -30 respectively in air. The thermostability of Ormosil-PANI/CB (30) is far more better than that of Ormosil and this is due to addition of PANI/CB. Yet after 650° C., 650° C. is heated, oxidized and degradated and residue amount is less than Ormosil. It follows that ratio of organic matter of Ormosil-PANI/CB(30) is higher than that of Ormosil so that Ormosil-PANI/CB(30) can be burned completely in air and the residue amount is less.

Salt Spray Test

6061-T6 and 2024-T3 aluminum alloy sheets coated with hybrid coatings are set into a salt spray testing chamber while testing procedure and testing parameters are standardized under standard of ASTM B117. Use a 300× metallurgical microscope to observe surfaces of test sheets at 24-hour intervals. According to military specification MIL-C-81706/5541, number of rust spot within 100 $mm^2$ test area should be no more than two. Moreover, chemical conversion coatings basically should be resistant to salt spray corrosion for at least 168 hours.

Figure 20A:
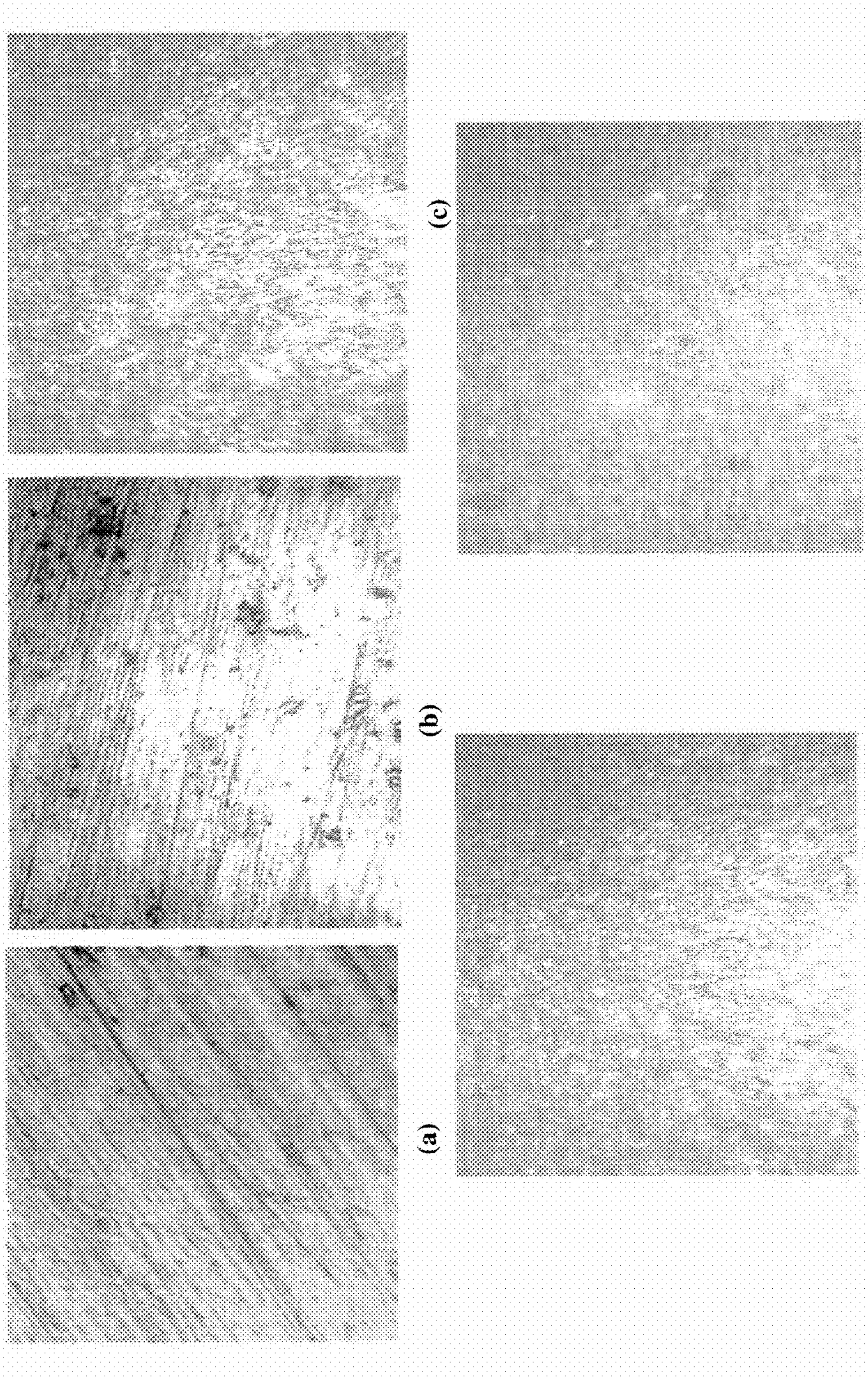
FIG. 20A are photomicrographs of 2024-T3 aluminum alloy sheet, 2024-T3 aluminum alloy sheets coated with Ormosil and different Ormosil-PANI/CB taken by a metallurgical microscope.
Figure 20B:
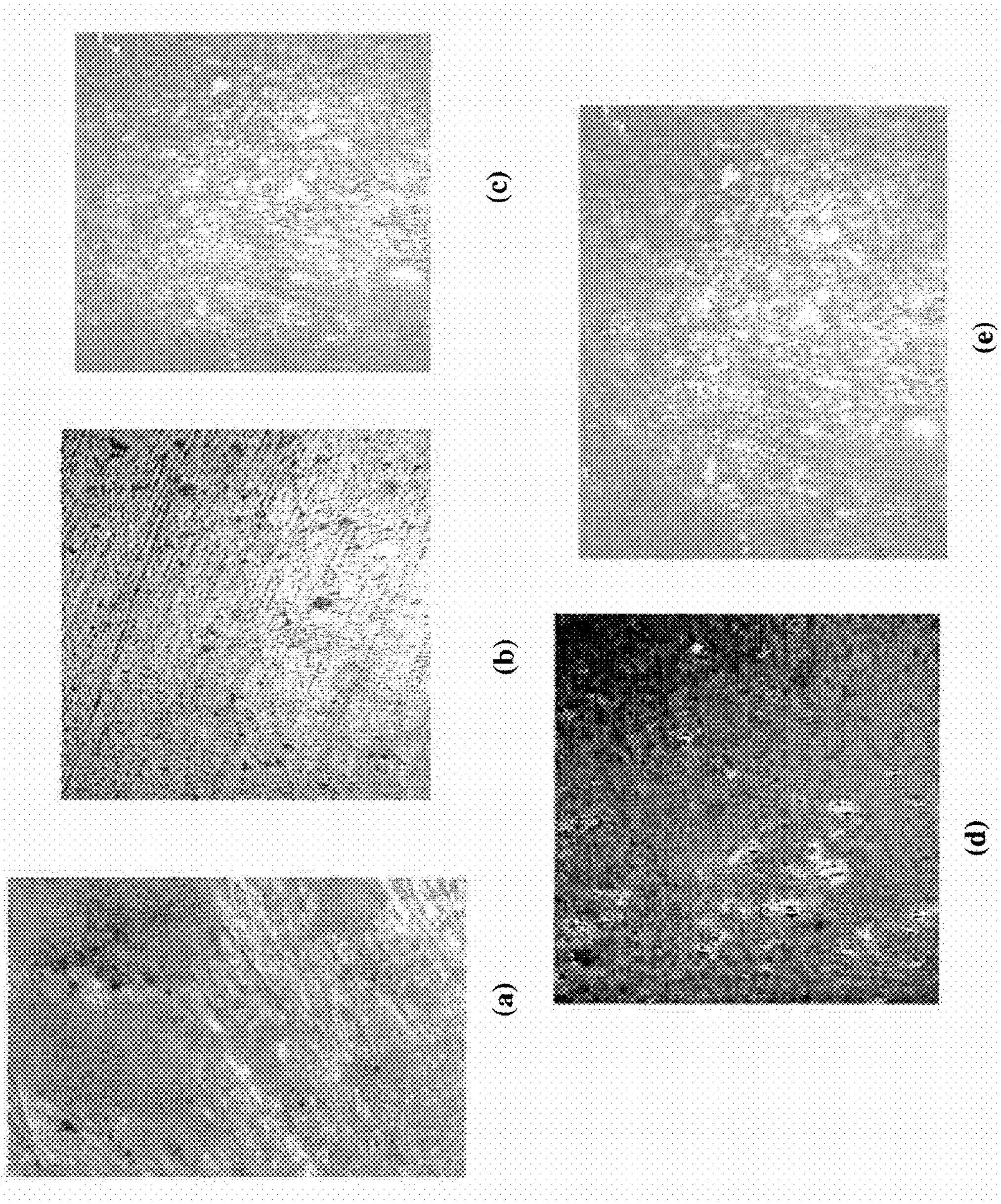
FIG. 20B are photomicrographs of 2024-T3 aluminum alloy sheet, 2024-T3 aluminum alloy sheets coated with Ormosil and different Ormosil-PANI/CB taken by a metallurgical microscope after being tested by the salt spray test for 7 days.
Figure 20C:
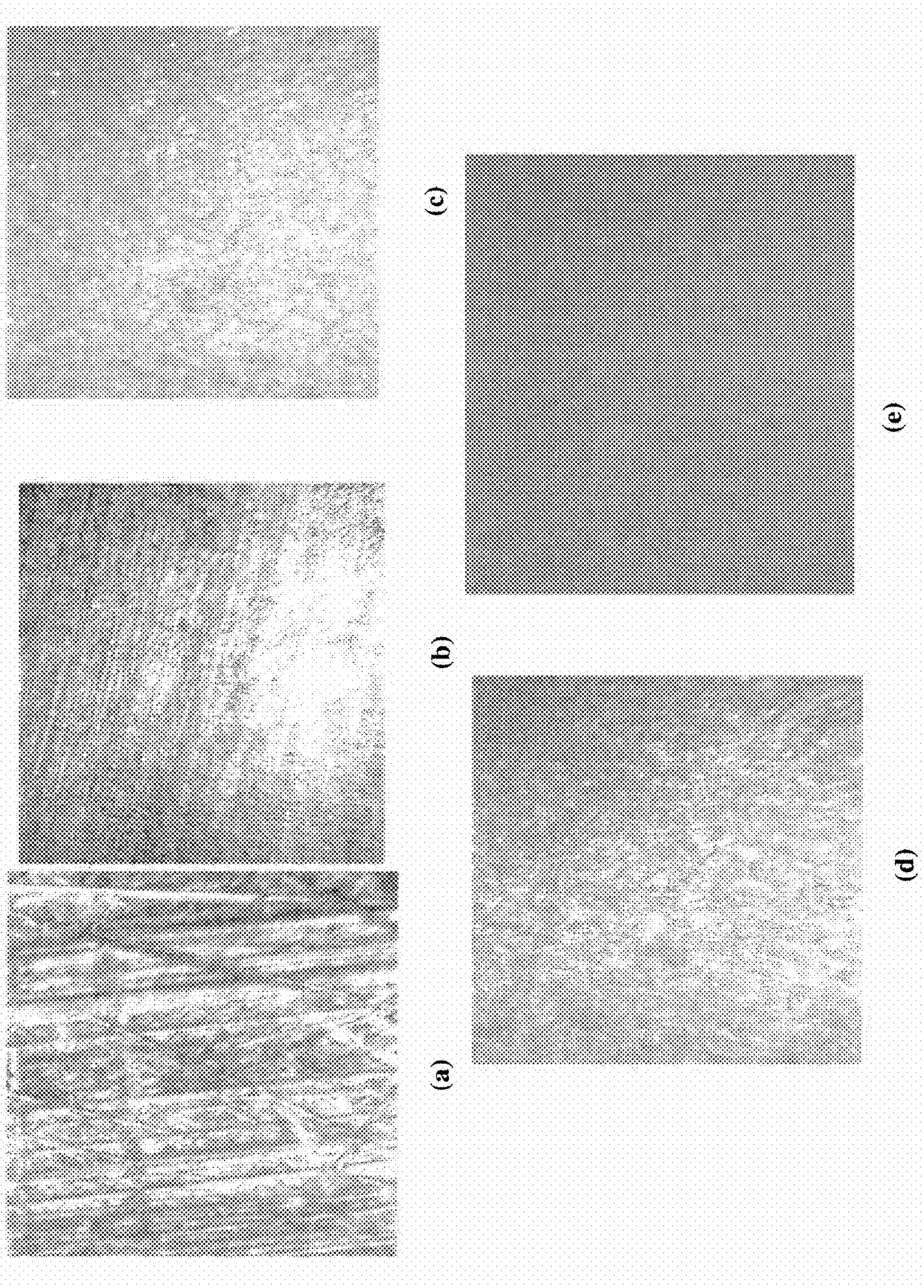
FIG. 20C are photomicrographs of 6061-T6 aluminum alloy sheet, 2024-T3 aluminum alloy sheets coated with Ormosil and different Ormosil-PANI/CB taken by a metallurgical microscope.
Figure 20D:
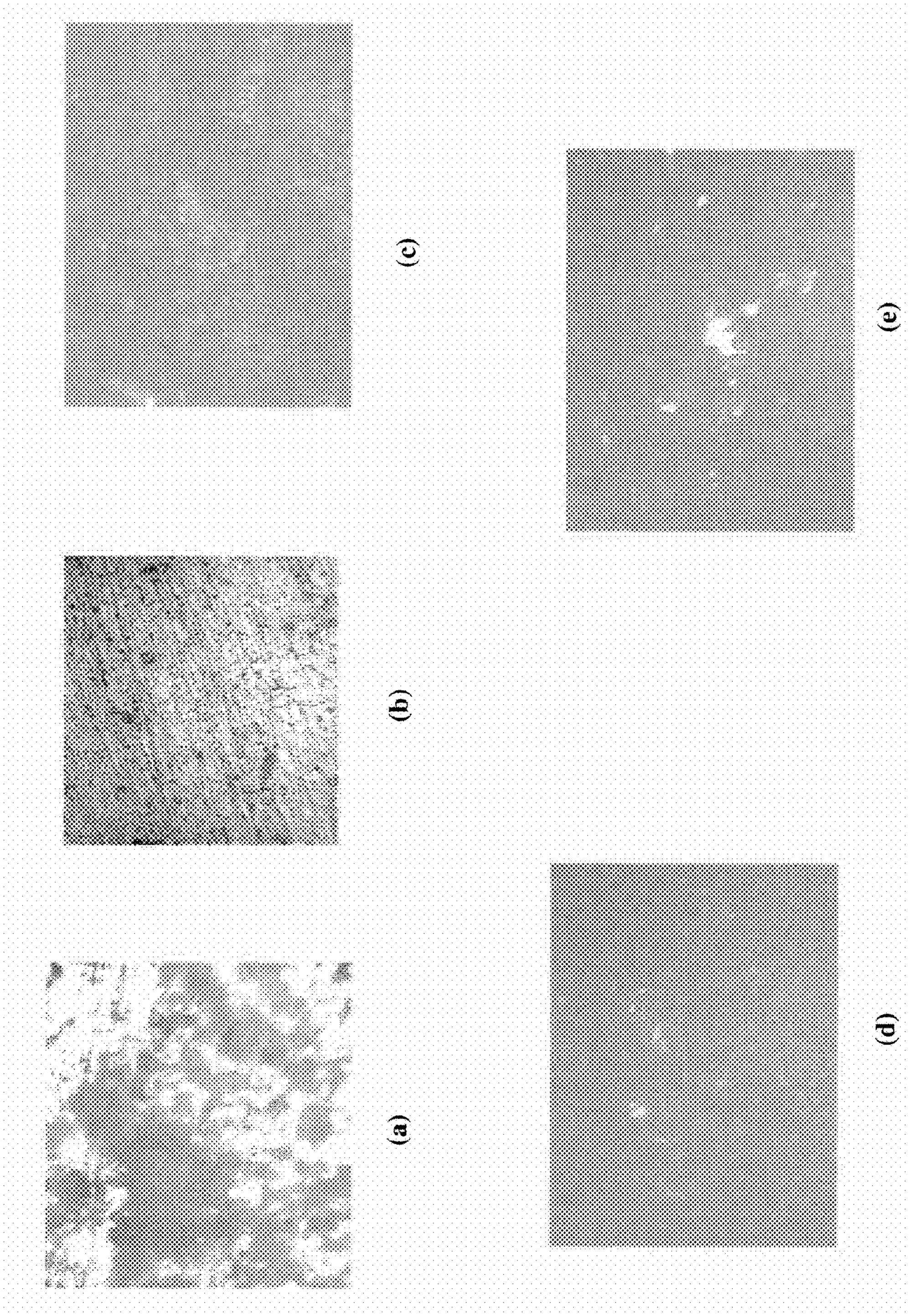
FIG. 20D are photomicrographs of 6061-T6 aluminum alloy sheet, 2024-T3 aluminum alloy sheets coated with Ormosil and different Ormosil-PANI/CB taken by a metallurgical microscope after being tested by the salt spray test for 7 days.

Refer to FIG. 20A, (a), (b), (c), (d) and (e) are photomicrographs of 2024-T3-0D aluminum alloy sheet, 2024-T3 aluminum alloy sheets coated with Ormosil-0D, Ormosil-PANI/CB(20)-10-0D, Ormosil-PANI/CB(20)-20-0D and Ormosil-PANI/CB(20)-30-0D taken by a metallurgical microscope. In FIG. 20B, (a), (b), (c), (d) and (e) are photomicrographs of 2024-T3-7D aluminum alloy sheet, 2024-T3-7D aluminum alloy sheets coated with Ormosil-7D, Ormosil-PANI/CB (20)-10-7D, Ormosil-PANI/CB(20)-20-7D and Ormosil-PANI/CB(20)-30-7D taken with a metallurgical microscope. With reference of FIG. 20C, (a), (b), (c), (d) and (e) are photomicrographs of 6061-T6-0D aluminum alloy sheet, 6061-T6 aluminum alloy sheets coated with Ormosil-0D, Ormosil-PANI/CB(20)-10-0D, Ormosil-PANI/CB(20)-20-0D and Ormosil-PANI/CB(20)-30-0D taken with a metallurgical microscope. In FIG. 20D, (a), (b), (c), (d) and (e) are photomicrographs of 6061-T6-0D aluminum alloy sheet 6061-T6-0D aluminum alloy sheets coated with Ormosil-7D, Ormosil-PANI/CB(20)-10-7D, Ormosil-PANI/CB(20)-20-7D and Ormosil-PANI/CB(20)-30-7D taken with a metallurgical microscope. The 0D and 7D represent test period in a unit of day.

After the salt spray test, a metallurgical microscope is used to observe corrosion on surface of aluminum alloy. After 7 days of test period, both 6061-T6 and 2024-T3 blank aluminum alloy sheets (without coating) have quite large rusted area while aluminum alloy sheets coated with Ormosil has only small area of rust. Taking PANI/CB(20) as an example, refer from FIG. 20A to FIG. 20D, aluminum alloy sheet coated with Ormosil-PANI/CB has compact structure on surface so that there is no corrosion after 7-day test period of salt spray test. But along with increasing amount of PANI/CB(20) being added, small part of the Ormosil-PANI/CB(20) attached on surface thereof begins to feel. The more amount of PANI/CB(20) is added, the more obvious the peeling is. It follows that adhesion of the carbon black in hybrid to the alloy sheet is not strong enough. After observations, it is found that change of ratio of aniline to carbon black has no obvious effect on results of the salt spray test. Results of observations by the metallurgical microscope are similar to those of Ormosil-PANI/CB(20). Moreover, corrosion resistance of Ormosil-PANI/CB hybrid coating on the 6061-T6 alloy sheet is better than that on the 2024-T3 alloy sheet.

In summary, ratio of PANI/CB composites in the organic siloxane composite material containing polyaniline/carbon black according to the present invention has effects on conductivity while PANI/CB composite increases conductivity of organic siloxane (Ormosil). Moreover, coat the organic siloxane composite material containing polyaniline/carbon black on aluminum alloy sheets and perform salt spray tests for 7 days. The results show that the test sheets with coating have longer corrosion time so that the coating provides good corrosion protection.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An organic siloxane composite material containing polyaniline/carbon black comprising:

a plurality of polyaniline/carbon black composites distributed in organic siloxane;

said organic siloxane composite material containing polyaniline/carbon black has from 10 to 30 weight percent of polyaniline/carbon black composites;

wherein the carbon black is 20-30 percent by weight of the polyaniline/carbon black composites.

2. The composite material as claimed in claim 1, wherein the polyaniline/carbon black composites include a core-shell structure.

3. The composite material as claimed in claim 2, wherein the polyaniline/carbon black composites with the core-shell structure have particle diameters ranging from 50 to 250 nm.

4. The composite material as claimed in claim 2, wherein polyaniline covers on surface of carbon black to form the polyaniline/carbon black composites with the core-shell structure.

5. The composite material as claimed in claim 4, wherein particle diameter of the carbon black ranges from 10 to 80 nm.

6. The composite material as claimed in claim 1, wherein the organic siloxane is sol-like organic siloxane or organic siloxane composite with network structure.

* * * * *